US012804437B2

(12) United States Patent
Shirakawa et al.

(10) Patent No.: US 12,804,437 B2
(45) Date of Patent: Nov. 17, 2026

(54) STATION APPARATUS AND ACCESS POINT APPARATUS

(71) Applicant: SHARP KABUSHIKI KAISHA, Sakai City (JP)

(72) Inventors: Atsushi Shirakawa, Sakai City (JP); Hiromichi Tomeba, Sakai City (JP); Hideo Namba, Osaka (JP); Takuhiro Sato, Osaka (JP); Ryota Yamada, Osaka (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 471 days.

(21) Appl. No.: 18/266,285

(22) PCT Filed: Dec. 16, 2021

(86) PCT No.: PCT/JP2021/046435
§ 371 (c)(1),
(2) Date: Jun. 9, 2023

(87) PCT Pub. No.: WO2022/131317
PCT Pub. Date: Jun. 23, 2022

(65) Prior Publication Data

US 2024/0031853 A1 Jan. 25, 2024

(30) Foreign Application Priority Data

Dec. 17, 2020 (JP) ................................ 2020-209026
Jan. 29, 2021 (JP) ................................ 2021-012783

(51) Int. Cl.
*H04W 24/10* (2009.01)
*H04L 5/00* (2006.01)
*H04W 72/0453* (2023.01)

(52) U.S. Cl.
CPC .......... *H04W 24/10* (2013.01); *H04L 5/0048* (2013.01); *H04W 72/0453* (2013.01)

(58) Field of Classification Search
CPC . H04W 24/10; H04W 72/0453; H04W 76/15; H04W 84/12; H04W 28/0908;
(Continued)

(56) References Cited

U.S. PATENT DOCUMENTS 9,344,963 B2 * 5/2016 Seok .................... H04W 84/12
9,877,276 B2 * 1/2018 Seok .................... H04W 74/06
(Continued)

FOREIGN PATENT DOCUMENTS

WO 2018/101110 A1 6/2018

OTHER PUBLICATIONS

Rui Cao et al., "Aggregated PPDU for Large BW", doc.: IEEE 802.11-20/0693r1, Date: May 20, 2020.
(Continued)

*Primary Examiner* — Brian T O Connor
(74) *Attorney, Agent, or Firm* — ScienBiziP, P.C.

(57) ABSTRACT

Provided is a station apparatus for wirelessly communicating with an access point apparatus through multi-link, the access point apparatus including multiple sub access point units, the station apparatus including multiple sub station units, wherein a sub station unit of the multiple sub station units includes a frame receiver configured to receive a radio frame, a measurement circuitry configured to measure reception quality of the received radio frame, and a frame transmitter configured to transmit the radio frame, and the sub station unit is configured to report information related to the reception quality to the access point apparatus.

4 Claims, 19 Drawing Sheets

(58) Field of Classification Search
CPC ... H04W 74/06; H04W 74/085; H04W 28/14; H04W 52/0229; H04L 5/0048; H04L 5/0055; H04L 5/006; H04L 45/24; H04L 69/323
See application file for complete search history.

(56) References Cited

U.S. PATENT DOCUMENTS

| | | | | |
|---|---|---|---|---|
| 10,397,932 | B2 * | 8/2019 | Gonzalez Garrido | H04W 52/50 |
| 11,672,038 | B2 * | 6/2023 | Kwon | H04W 8/26 370/338 |
| 11,917,676 | B2 * | 2/2024 | Inohiza | H04W 76/11 |
| 11,924,823 | B2 * | 3/2024 | Kwon | H04W 72/1263 |
| 12,114,383 | B2 * | 10/2024 | Kwon | H04W 76/15 |
| 12,309,101 | B2 * | 5/2025 | Ko | H04L 5/0055 |
| 12,323,884 | B2 * | 6/2025 | Huang | H04W 4/06 |
| 12,356,480 | B2 * | 7/2025 | Chitrakar | H04W 76/14 |
| 12,446,089 | B2 * | 10/2025 | Kishida | H04W 76/15 |
| 12,452,784 | B2 * | 10/2025 | Huang | H04B 17/309 |
| 2016/0262163 | A1 * | 9/2016 | Gonzalez Garrido | H04W 16/10 |
| 2019/0386768 | A1 | 12/2019 | Shimoji | |
| 2020/0163141 | A1 * | 5/2020 | Hsu | H04W 28/10 |
| 2020/0221545 | A1 * | 7/2020 | Stacey | H04W 84/12 |
| 2021/0144778 | A1 * | 5/2021 | Cherian | H04W 4/90 |
| 2022/0124856 | A1 * | 4/2022 | Patil | H04W 76/15 |
| 2022/0124857 | A1 * | 4/2022 | Patil | H04W 76/14 |
| 2023/0140556 | A1 * | 5/2023 | Ko | H04W 76/15 370/329 |
| 2023/0156840 | A1 * | 5/2023 | Chitrakar | H04W 76/14 370/329 |
| 2023/0171818 | A1 * | 6/2023 | Cherian | H04W 4/90 370/329 |
| 2023/0269804 | A1 * | 8/2023 | Kishida | H04W 76/15 370/311 |
| 2023/0319927 | A1 * | 10/2023 | Kwon | H04W 72/23 370/338 |
| 2024/0031147 | A1 * | 1/2024 | Huang | H04W 12/106 |
| 2024/0040636 | A1 * | 2/2024 | Cariou | H04W 74/0816 |
| 2024/0259857 | A1 * | 8/2024 | Zhu | H04W 28/0252 |
| 2025/0203648 | A1 * | 6/2025 | Jang | H04W 76/15 |

OTHER PUBLICATIONS

Po-Kai Huang et al., "Multi-link Operation Framework", doc.: IEEE 802.11-19/0773r8, Date: Jul. 1, 2019.
Pooya Monajemi et al., "Dynamic Link Sets for MLDs", doc.: IEEE 802.11-20/0810r1, Date: May 15, 2020.
Sindhu Verma et al., "Proposals on Multilink Power Save and Link Management", doc.: IEEE 802.11-20/0289r1, Date: Mar. 16, 2020.
Taewon Song et al., "Multi-link Management", doc.: IEEE 802.11-19/1943r9, Date: Nov. 11, 2019.

* cited by examiner

| MCS | MODULATION SCHEME | CODING RATE |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |

FIG. 16

| CODING RATE | LDPC INFORMATION BLOCK LENGTH (BITS) | LDPC CODEWORD BLOCK LENGTH (BITS) |
|---|---|---|
| 1/2 | 972 | 1944 |
| 1/2 | 648 | 1296 |
| 1/2 | 324 | 648 |
| 2/3 | 1296 | 1944 |
| 2/3 | 864 | 1296 |
| 2/3 | 432 | 648 |
| 3/4 | 1458 | 1944 |
| 3/4 | 972 | 1296 |
| 3/4 | 486 | 648 |
| 5/6 | 1620 | 1944 |
| 5/6 | 1080 | 1296 |
| 5/6 | 540 | 648 |

FIG. 17

STATION APPARATUS AND ACCESS POINT APPARATUS

TECHNICAL FIELD

The present invention relates to a radio communication apparatus, a station apparatus and a radio communication system. This application claims priority based on Japanese Patent Application No. 2020-209026, filed on Dec. 17, 2020 and Japanese Patent Application No. 2021-012783, filed on Jan. 29, 2021, the contents of which are incorporated herein by reference.

BACKGROUND ART

The Institute of Electrical and Electronics Engineers Inc. (IEEE) has been continuously working on updating of the IEEE 802.11 specification that is a wireless Local Area Network (LAN) standard in order to achieve an increase in speed and frequency efficiency of the wireless LAN network. In a wireless LAN, it is possible to perform radio communication using unlicensed bands that can be used without being allowed (licensed) by nations or regions. For applications for individuals, such as for domestic use, Internet accesses from inside residences has been wirelessly established by, for example, including wireless LAN access point functions in optical network units for connection to a Wide Area Network (WAN) line such as the Internet or connecting wireless LAN access point apparatuses to the optical network units. In other words, wireless LAN station apparatuses such as smartphones and PCs can associate to wireless LAN access point apparatuses and access the Internet.

The specification of IEEE 802.11ax is expected to be formulated in 2020, and communication apparatuses such as wireless LAN devices compliant with the specification draft and smartphones and Personal Computers (PCs) equipped with the wireless LAN devices have already appeared on the market as products that are compliant with Wi-Fi 6 (trade name; a name for IEEE 802.11ax compliant products certified by the Wi-Fi Alliance). Also, activities for standardizing IEEE 802.11be as a standard subsequent to IEEE 802.11ax has been started in recent days. With the rapid distribution of wireless LAN devices, further improvement in throughput per user in environments where wireless LAN devices are densely disposed has been studied in the standardization of IEEE 802.11be.

On the other hand, the European Telecommunications Standards Institute (ETSI) in Europe and the Federal Communications Commission (FCC) in the United States have been conducting studies to allow the 6 GHz band (5.935 to 7.125 GHz) to be used as an unlicensed band, and similar studies are also under way in other countries in the world. This means that wireless LANs are expected to be able to use the 6 GHz band in addition to the 2.4 GHz band and 5 GHz. In order to cope with the expansion of target frequencies, the Wi-Fi Alliance has formulated Wi-Fi 6E (trade name), which is an extended version of Wi-Fi 6 and uses the 6 GHz band.

To be precise, the 6 GHz band includes frequencies of 5.935 to 7.125 GHz, and this means that a total of approximately 1.2 GHz can be newly used as the bandwidth. This corresponds to an increase by 14 channels in terms of 80 MHz width channels and to an increase by 7 channels in terms of 160 MHz width channels. Abundant frequency resources are expected to be available, and thus, studies have been conducted about extension of the maximum channel bandwidth usable by one wireless LAN communication system (equivalent to a BSS described below) from 160 MHz in IEEE 802.11ax to 320 MHz in IEEE 802.11be, which is twice the channel bandwidth (see NPL 1).

The 2.4 GHz band provides a relatively large coverage (communicable range), while enabling the use of only a relatively narrow bandwidth, leading to a significant effect of interference between communication apparatuses. On the other hand, while the 5 GHz band and the 6 GHz band provide large communication bandwidths, while failing to provide a wide coverage. For those reasons, to implement a variety of service applications on a wireless LAN, frequency bands used (2.4 GHz band, 5 GHz band, 6 GHz band, and the like, or channels included in each frequency band or subchannels included in the channels) are desirably appropriately switched for use depending on a use case. However, in the known wireless LAN communication apparatus, in order to switch the frequency band used for communication, connection in the current frequency band needs to be released, and connection in another frequency band needs to be established.

Thus, in IEEE 802.11be standardization, Multi-Link Operation (MLO) has been discussed in which a communication apparatus uses multiple frequency bands to enable multiple link connections to be maintained (see NPL 2). As an example of the MLO, three link connections are simultaneously operated, including a 2.4 GHz band connection, a 5 GHz band connection, and a 6 GHz band connection (of course, frequency bands, channels, and subchannels may be variously combined together). The MLO allows a communication apparatus to maintain multiple connections with different configurations related to radio resources and communication used by the communication apparatus. That is, the communication apparatus can simultaneously maintain connections in different frequency bands by using the MLO, and can thus change the frequency band for frame transmission and/or reception without performing a reconnection operation.

CITATION LIST

Non Patent Literature

NPL 1: IEEE 802.11-20/0693-01-00be, May 2020
NPL 2: IEEE 802.11-19/0773-08-00be, November 2019
NPL 3: IEEE 802.11-20/0810-01-00be, July 2020

SUMMARY OF INVENTION

Technical Problem

The MLO may enable implementation of large-capacity communication for increasing throughput as a whole by bundling and simultaneously using multiple connections (Multi-Link) for frame transmission. Links constituting the multi-link may be independently used instead of being bundled and simultaneously used, and frames may be transmitted and/or received. For example, by avoiding a congested wireless channel and appropriately selecting a free link for frame transmission, delay or latency that may occur during transmission may be reduced to allow implementation of low latency communication. The large-capacity communication and the low-latency communication based on the multi-link are characterized in that the level of performance may increase as the quality of each link constituting a multi-link (as competing wireless devices is fewer and thus interference is less, received signal strength is higher, frame reception error rate is lower, and the like).

On the other hand, as described in NPL 3, in a case that one of the links constituting the multi-link has good quality, this does not necessarily guarantee the good quality of the other links. This involves several factors. One of the factors is that propagation loss varies depending on frequency band. For example, the propagation loss at 2.4 GHz is smaller than the propagation loss at 5 GHz or 6 GHz. This means that even in a case that a 2.4 GHz link has a high received signal strength, a 5 GHz link does not necessarily have a high received signal strength. In other words, even in a case that the 2.4 GHz link has good quality, the 5 GHz link does not necessarily have good quality. Another factor may be a difference in antenna configuration (including directivity and the like) and transmission power of the radio unit of each frequency band included in the radio apparatus. Furthermore, even in the same link, there may be a difference in radio communication quality between uplink communication and downlink communication. This is because, in general, a base station apparatus, an access point apparatus, or the like constituting a radio communication system has good amplifier characteristics and large transmission power, whereas a terminal apparatus or a station apparatus connected to the base station apparatus or the access point apparatus may have relatively poor amplifier characteristics and relatively small transmission power. In this case, even in the same link, the quality of the uplink communication may be inferior to the quality of the downlink communication.

In other words, even in a case that a multi-link is established (set up) with only one link evaluated for quality, the link being included in the links constituting the multi-link, and then communication is started, sufficient performance for large-capacity communication or low-latency communication may fail to be achieved due to the poorness of the quality of the other links with quality not evaluated. Even in a case that all the links constituting the multi-link is evaluated for quality in advance, links having good quality are selected, a multi-link is established (set up), and then communication is started, a change in the radio environment may follow the establishment (set up). For example, in a case that the radio environment changes due to the movement of a station apparatus or the movement of a person or an object within the coverage of the radio communication system, the quality of a certain link may be degraded, and as a result, the effect of multi-link communication fails to be obtained, and the performance of large-capacity communication or low-latency communication may be degraded. As described above, a problem with the existing mechanism is that the above-described factors and the like may prevent the effect of the multi-link communication from being obtained.

Solution to Problem

A communication apparatus and a communication method according to an aspect of the present invention for solving the aforementioned problem are as follows.

(1) Specifically, an aspect of the present invention provides a station apparatus for wirelessly communicating with an access point apparatus through multi-link, the access point apparatus including multiple sub access point units, the station apparatus including: multiple sub station units, wherein a sub station unit of the multiple sub station units includes a frame receiver configured to receive a radio frame, a measurement circuitry configured to measure reception quality of the received radio frame, and a frame transmitter configured to transmit the radio frame, and the sub station unit is configured to report information related to the reception quality to the access point apparatus.

(2) In the station apparatus according to an aspect of the present invention and to (1) described above, the multi-link is determined and established by the access point apparatus based on the information related to the reception quality.

(3) In the station apparatus according to an aspect of the present invention and to (2) described above, the information related to the reception quality is a received level of broadcast information transmitted by the sub access point unit.

(4) In the station apparatus according to an aspect of the present invention described in (2) above, the information related to the reception quality is an SNR of broadcast information transmitted by the sub access point unit.

(5) In the station apparatus according to an aspect of the present invention and to (2) described above, the information related to the reception quality is information as to whether a quality check frame is receivable, the information being transmitted by the sub access point unit.

(6) In the station apparatus according to an aspect of the present invention and to (5) described above, the quality check frame is modulated with an MCS larger than an MCS of broadcast information transmitted by the sub access point unit.

(7) In the station apparatus according to an aspect of the present invention and to (1) described above, the information related to the reception quality is reported to the access point apparatus even after the multi-link is established.

(8) An aspect of the present invention provides an access point apparatus for wirelessly communicating with a station apparatus through multi-link, the station apparatus including multiple sub station units, the access point apparatus including: multiple sub access point units, wherein the access point apparatus includes a controller configured to control the multi-link used for the radio communication, a frame receiver configured to receive a radio frame, and a frame transmitter configured to transmit a radio frame, and receives information related to reception quality reported by the station apparatus.

Advantageous Effects of Invention

According to an aspect of the present invention, after a multi-link is established (set up) and then communication is started, the station apparatus evaluates and reports communication quality of each link in response to a request from the access point apparatus. The access point apparatus changes a link used for multi-link communication based on the reported communication quality, thus enhancing the effects of the large-capacity communication and the low-latency communication corresponding to features of the multi-link communication.

BRIEF DESCRIPTION OF DRAWINGS

FIG. 16 is a schematic diagram illustrating an example of a modulation and coding scheme according to an aspect of the present invention.

FIG. 17 is a schematic diagram illustrating an example of a block length for LDPC coding processing according to an aspect of the present invention.

DESCRIPTION OF EMBODIMENTS

Figure 1:
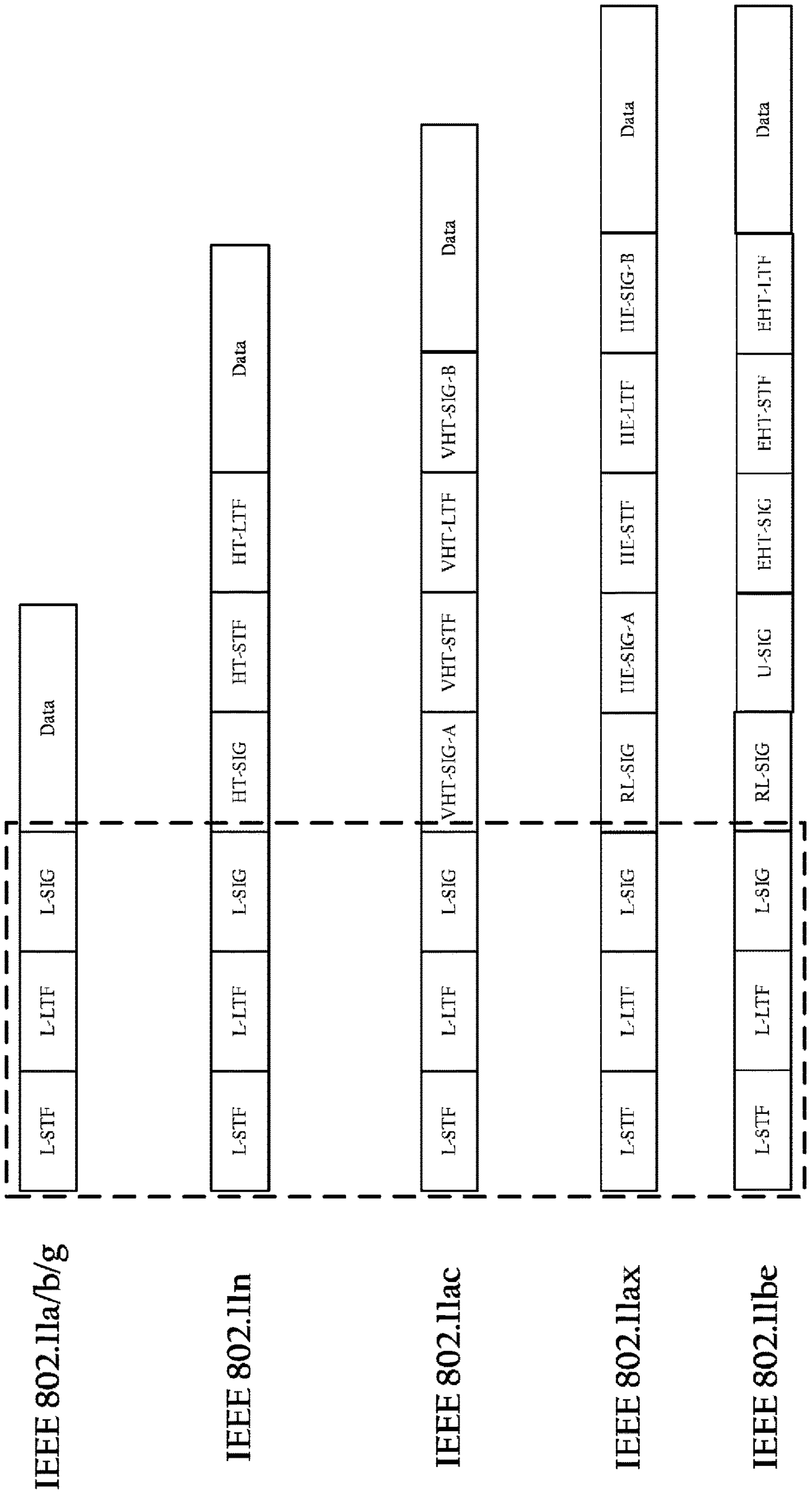
FIG. 1 is a diagram illustrating an example of a frame configuration according to an aspect of the present invention.

A communication system according to the present embodiment includes an access point apparatus (or also referred to as a base station apparatus) and a plurality of station apparatuses (or also referred to as a plurality of terminal apparatuses). The communication system and a network including the access point apparatus and the station apparatus will be referred to as a Basic service set (BSS: management range or cell). In addition, the station apparatus according to the present embodiment can have functions of the access point apparatus. Similarly, the access point apparatus according to the present embodiment can have functions of the station apparatus. Therefore, in a case that a communication apparatus is simply mentioned below, the communication apparatus can indicate both the station apparatus and the access point apparatus.

The base station apparatus and the terminal apparatus in the BSS are assumed to perform communication based on Carrier sense multiple access with collision avoidance (CSMA/CA). Although the present embodiment is intended for an infrastructure mode in which a base station apparatus performs communication with multiple terminal apparatuses, the method of the present embodiment can also be performed in an ad hoc mode in which terminal apparatuses perform communication directly with each other. In the ad hoc mode, the terminal apparatuses substitute the base station apparatus to form a BSS. The BSS in the ad hoc mode will also be referred to as an independent basic service set (IBSS). In the following description, a terminal apparatus that forms an IBSS in the ad hoc mode can also be considered to be a base station apparatus. The method of the present embodiment can also be performed in Wi-Fi Direct (trade name) in which terminal apparatuses directly communicate with each other. In Wi-Fi Direct, the terminal apparatuses form a Group instead of the base station apparatus. Hereinafter, the terminal apparatus as a Group owner forming a Group in Wi-Fi Direct can also be regarded as a base station apparatus.

In an IEEE 802.11 system, each apparatus can transmit transmission frames of multiple frame types in a common frame format. Each of transmission frames is defined as a physical (PHY) layer, a medium access control (MAC) layer, and a logical link control (LLC) layer.

A transmission frame of the PHY layer will be referred to as a physical protocol data unit (PPDU, PHY protocol data unit, or physical layer frame). The PPDU includes a physical layer header (PHY header) including header information and the like for performing signal processing in the physical layer, a physical service data unit (PSDU, PHY service data unit, or MAC layer frame) that is a data unit processed in the physical layer, and the like. The PSDU can include an aggregated MAC protocol data unit (MPDU) (A-MPDU, aggregated MPDU) in which multiple MPDUs serving as retransmission units in a wireless section are aggregated.

A PHY header includes a reference signal such as a short training field (STF) used for detection, synchronization, and the like of signals, a long training field (LTF) used for obtaining channel information for demodulating data, and the like and a control signal such as a signal (SIG) including control information for demodulating data. In addition, STFs are classified into a legacy-STF (L-STF), a high throughput-STF (HT-STF), a very high throughput-STF (VHT-STF), a high efficiency-STF (HE-STF), an extremely high throughput-STF (EHT-STF), and the like in accordance with corresponding standards, and LTFs and SIGs are also similarly classified into an L-LTF, an HT-LTF, a VHT-LTF, an HE-LTF, an L-SIG, an HT-SIG, a VHT-SIG, an HE-SIG, and an EHT-SIG depending on the corresponding standards. The VHT-SIG is further classified into VHT-SIG-A1, VHT-SIG-A2, and VHT-SIG-B. Similarly, the HE-SIG is classified into HE-SIG-A1 to 4 and HE-SIG-B. In addition, on the assumption of technology update in the same standard, a universal SIGNAL (U-SIG) field including additional control information can be included.

Furthermore, the PHY header can include information for identifying a BSS of a transmission source of the transmission frame (hereinafter, also referred to as BSS identification information). The information for identifying a BSS can be, for example, a service set identifier (SSID) of the BSS or a MAC address of a base station apparatus of the BSS. In addition, the information for identifying a BSS can be a value unique to the BSS (e.g., a BSS color, etc.) other than an SSID or a MAC address.

The PPDU is modulated in accordance with the corresponding standard. In the IEEE 802.11n standard, for example, the PPDU is modulated into an orthogonal frequency division multiplexing (OFDM) signal.

An MPDU includes a MAC layer header (MAC header) including header information and the like for performing signal processing in the MAC layer, a MAC service data unit (MSDU) or a frame body that is a data unit processed in the MAC layer, and a frame check sequence (FCS) for checking whether there is an error in a frame. In addition, multiple MSDUs can be aggregated as an Aggregated MSDU (A-MSDU).

Frame types of a transmission frame of the MAC layer are generally classified into three frame types, namely a management frame for managing a connection state and the like between apparatuses, a control frame for managing a communication state between apparatuses, and a data frame including actual transmission data, and each frame type is further classified into multiple types of subframes. The control frame includes a reception completion notification (Acknowledge or Ack) frame, a transmission request (Request to send or RTS) frame, a reception preparation completion (Clear to send or CTS) frame, and the like. The management frame includes a beacon frame, a probe request frame, a probe response frame, an authentication frame, a connection request (Association request) frame, a connection response (Association response) frame, and the like. The data frame includes a data frame, a polling (CF-poll) frame, and the like. Each apparatus can recognize the frame type and the subframe type of a received frame by interpreting contents of the frame control field included in the MAC header.

Further, an Ack may include a Block Ack. A Block Ack can give a reception completion notification with respect to multiple MPDUs. The Ack may include a Multi STA Block Ack (M-BA) including a reception completion notification for multiple communication apparatuses.

The beacon frame includes a field in which an interval at which a beacon is transmitted (beacon interval) and an SSID are described. The base station apparatus can periodically broadcast a beacon frame within a BSS, and each terminal apparatus can recognize the base station apparatus in the surroundings of the terminal apparatus by receiving the beacon frame. The action of the terminal apparatus recognizing the base station apparatus based on the beacon frame broadcast from the base station apparatus will be referred to as passive scanning. On the other hand, the action of the terminal apparatus searching for the base station apparatus by broadcasting a probe request frame in the BSS will be referred to as active scanning. The base station apparatus can transmit a probe response frame in response to the probe request frame, and details described in the probe response frame are equivalent to those in the beacon frame.

The terminal apparatus recognizes the base station apparatus and performs a connection process with respect to the base station apparatus. The connection process is classified into an authentication procedure and a connection (association) procedure. The terminal apparatus transmits an authentication frame (authentication request) to the base station apparatus desiring a connection. Once the base station apparatus receives the authentication frame, then the base station apparatus transmits, to the terminal apparatus, an authentication frame (authentication response) including a status code indicating whether authentication can be made for the terminal apparatus. The terminal apparatus can determine whether the terminal apparatus has been authenticated by the base station apparatus by interpreting the status code described in the authentication frame. Further, the base station apparatus and the terminal apparatus can exchange the authentication frame multiple times.

After the authentication procedure, the terminal apparatus transmits a connection request frame to the base station apparatus in order to perform the connection procedure. Once the base station apparatus receives the connection request frame, the base station apparatus determines whether to allow the connection to the terminal apparatus and transmits a connection response frame to notify the terminal apparatus of the intent. In the connection response frame, an association identifier (AID) for identifying the terminal apparatus is described in addition to the status code indicating whether to perform the connection process. The base station apparatus can manage multiple terminal apparatuses by configuring different AIDs for the terminal apparatuses for which the base station apparatus has allowed connection.

After the connection process is performed, the base station apparatus and the terminal apparatus perform actual data transmission. In the IEEE 802.11 system, a distributed coordination function (DCF), a point coordination function (PCF), and mechanisms in which the aforementioned mechanisms are enhanced (an enhanced distributed channel access (EDCA) or a hybrid control mechanism (hybrid coordination function (HCF)), and the like) are defined. A case that the base station apparatus transmits signals to the terminal apparatus using the DCF will be described below as an example. However, the description also applies to a case that the terminal apparatus transmits signals to the base station apparatus using the DCF.

In the DCF, the base station apparatus and the terminal apparatus perform carrier sense (CS) for checking usage of a radio channel in the surroundings of the apparatuses prior to communication. For example, in a case that the base station apparatus serving as a transmitting station receives a signal of a higher level than a predefined clear channel assessment level (CCA level) on a radio channel, transmission of transmission frames on the radio channel is postponed. Hereinafter, a state in which a signal of a level that is equal to or higher than the CCA level is detected on the radio channel will be referred to as a busy (Busy) state, and a state in which a signal of a level that is equal to or higher than the CCA level is not detected will be referred to as an idle (Idle) state. In this manner, CS performed based on power of a signal actually received by each apparatus (reception power level) is called physical carrier sense (physical CS). Further, the CCA level is also called a carrier sense level (CS level) or a CCA threshold (CCAT). Further, in a case that a signal of a level that is equal to or higher than the CCA level has been detected, the base station apparatus and the terminal apparatus start to perform an operation of demodulating at least a signal of the PHY layer.

The base station apparatus performs carrier sensing by an inter-frame space (IFS) in accordance with the type of transmission frame to be transmitted and determines whether the radio channel is busy or idle. A period in which the base station apparatus performs carrier sensing varies depending on the frame type and the subframe type of a transmission frame to be transmitted by the base station apparatus. In the IEEE 802.11 system, multiple IFSs with different periods are defined, and there are a short frame interval (Short IFS or SIFS) used for a transmission frame with the highest priority given, a polling frame interval (PCF IFS or PIFS) used for a transmission frame with a relatively high priority, a distribution control frame interval (DCF IFS or DIFS) used for a transmission frame with the lowest priority, and the like. In a case that the base station apparatus transmits a data frame with the DCF, the base station apparatus uses the DIFS.

The base station apparatus waits by DIFS and then further waits for a random backoff time to prevent frame collision. In the IEEE 802.11 system, a random backoff time called a contention window (CW) is used. CSMA/CA works with the assumption that a transmission frame transmitted by a certain transmitting station is received by a receiving station in a state in which there is no interference from other transmitting stations. Therefore, in a case that transmitting stations transmit transmission frames at the same timing, the frames collide against each other, and the receiving station cannot receive them properly. Thus, each transmitting station waits for a randomly configured time before starting transmission, and thus collision of frames can be avoided. In a case that the base station apparatus determines, through carrier sensing, that a radio channel is idle, the base station apparatus starts to count down CW, acquires a transmission privilege for the first time after CW becomes zero, and can transmit the transmission frame to the terminal apparatus. Further, in a case that the base station apparatus determines through the carrier sensing that the radio channel is busy during the count-down of CW, the base station apparatus stops the count-down of CW. In addition, in a case that the radio channel is idle, then the base station apparatus restarts the count-down of the remaining CW after the previous IFS.

Next, details of frame reception will be described. A terminal apparatus that is a receiving station receives a transmission frame, interprets the PHY header of the transmission frame, and demodulates the received transmission frame. Then, the terminal apparatus interprets the MAC header of the demodulated signal and thus can recognize whether the transmission frame is addressed to the terminal apparatus itself. Further, the terminal apparatus can also determine the destination of the transmission frame based on information described in the PHY header (for example, a group identifier (Group ID or GID) listed in VHT-SIG-A).

In a case that the terminal apparatus determines that the received transmission frame is addressed to the terminal apparatus and has been able to demodulate the transmission frame without any error, the terminal apparatus has to transmit an ACK frame indicating that the frame has been properly received to the base station apparatus that is the transmitting station. The ACK frame is one of transmission frames with the highest priority transmitted only after a wait for the SIFS period (with no random backoff time). The base station apparatus ends the series of communications with the reception of the ACK frame transmitted from the terminal apparatus. Further, in a case that the terminal apparatus is not able to receive the frame properly, the terminal apparatus does not transmit ACK. Thus, in a case that the ACK frame has not been received from the receiving station for a certain period (a length of SIFS+ACK frame) after the transmission of the frame, the base station apparatus assumes that the communication has failed and ends the communication. In this manner, an end of a single communication operation (also called a burst) in the IEEE 802.11 system must be determined based on whether an ACK frame has been received except for special cases such as a case of transmission of a broadcast signal such as a beacon frame, a case that fragmentation for splitting transmission data is used, or the like.

In a case that the terminal apparatus determines that the received transmission frame is not addressed to the terminal apparatus itself, the terminal apparatus configures a network allocation vector (NAV) based on the length of the transmission frame described in the PHY header or the like. The terminal apparatus does not attempt communication during the period configured in the NAV. In other words, because the terminal apparatus performs the same operation as in the case that the terminal apparatus determines the radio channel is busy through physical CS for the period configured in the NAV, the communication control based on the NAV is also called virtual carrier sensing (virtual CS). The NAV is also configured by a request to send (RTS) frame or a clear to send (CTS) frame, which are introduced to solve a hidden terminal problem in addition to the case that the NAV is configured based on the information described in the PHY header.

Unlike the DCF in which each apparatus performs carrier sensing and autonomously acquires the transmission privilege, with respect to the PCF, a control station called a point coordinator (PC) controls the transmission privilege of each apparatus within a BSS. In general, the base station apparatus serves as a PC and acquires the transmission privilege of the terminal apparatus within a BSS.

A communication period using the PCF includes a contention-free period (CFP) and a contention period (CP). Communication is performed based on the aforementioned DCF during a CP, and a PC controls the transmission privilege during a CFP. The base station apparatus serving as a PC broadcasts a beacon frame with description of a CFP period (CFP max duration) and the like in a BSS prior to communication with a PCF. Further, the PIFS is used for transmission of the beacon frame broadcast at the time of a start of transmission by the PCF, and the beacon frame is transmitted without waiting for CW. Further, the terminal apparatus that has received the beacon frame configures the CFP period described in the beacon frame in a NAV. Hereinafter, the terminal apparatus can acquire the transmission privilege only in a case that a signal (e.g., a data frame including CF-poll) for broadcasting the acquisition of the transmission privilege transmitted by the PC is received until the NAV elapses or a signal (e.g., a data frame including CF-end) broadcasting the end of the CFP in the BSS is received. Further, because no packet collision occurs in the same BSS during the CFP period, each terminal apparatus does not take a random backoff time used for the DCF.

Figure 4:
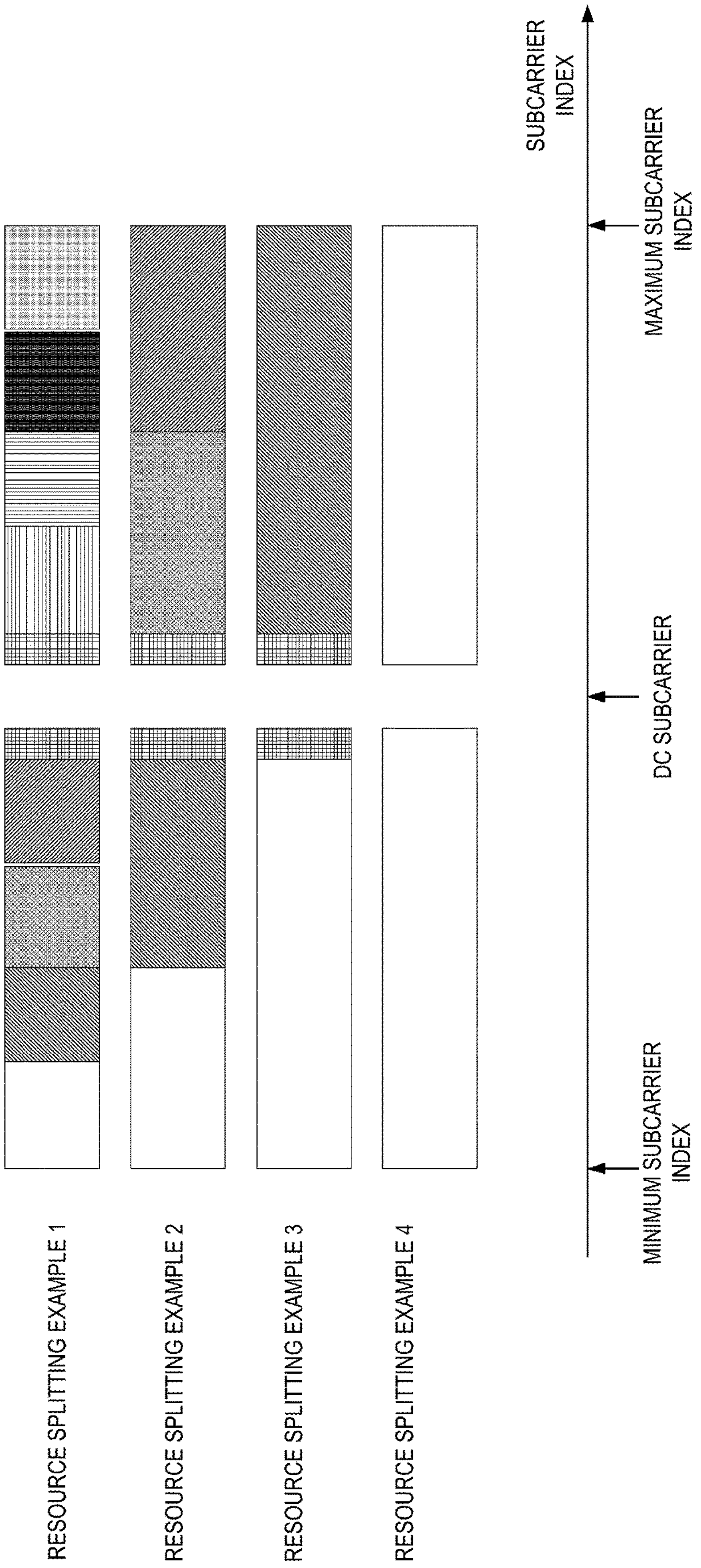
FIG. 4 is a schematic diagram illustrating examples of splitting of radio resources according to an aspect of the present invention.

A radio medium can be split into multiple resource units (RUs). FIG. 4 is a schematic diagram illustrating an example of a split state of a radio medium. In the resource splitting example 1, for example, the radio communication apparatus can split a frequency resource (subcarrier) that is a radio medium into nine RUs. Similarly, in a resource splitting example 2, the radio communication apparatus can split a subcarrier that is a radio medium into five RUs. It is a matter of course that the resource splitting examples illustrated in FIG. 4 are merely examples, and for example, each of multiple RUs can include a different number of subcarriers. Moreover, the radio medium that is split into RUs can include not only a frequency resource but also a spatial resource. The radio communication apparatus (e.g., an AP) can transmit frames to multiple terminal apparatuses (e.g., multiple STAs) at the same time by allocating frames addressed to different terminal apparatuses in each RU. An AP can describe information indicating a split state of the radio medium (resource allocation information) as common control information in the PHY header of the frame transmitted by the AP itself. Moreover, the AP can describe information indicating an RU in which a frame addressed to each STA is allocated (resource unit assignment information) as unique control information in the PHY header of the frame transmitted by the AP itself.

In addition, multiple terminal apparatuses (e.g., multiple STAs) can transmit frames at the same time by allocating and transmitting the frames in the RUs allocated to themselves, respectively. The multiple STAs can perform frame transmission after waiting for a predetermined period after receiving the frame including trigger information transmitted from the AP (trigger frame or TF). Each STA can recognize the RU allocated to the STA itself based on the information described in the TF. In addition, each STA can acquire the RU through random access with reference to the TF.

The AP can allocate multiple RUs to one STA at the same time. The multiple RUs can include continuous subcarriers or can include discontinuous subcarriers. The AP can transmit one frame using multiple RUs allocated to one STA or can transmit multiple frames after allocating them to different RUs. At least one of the multiple frames can be a frame including common control information for multiple terminal apparatuses that transmit resource allocation information.

One STA can be allocated multiple RUs by the AP. The STA can transmit one frame using the multiple allocated RUs. Also, the STA can use the multiple allocated RUs to transmit multiple frames allocated to different RUs. The multiple frames can be frames of different types.

The AP can allocate multiple AIDs to one STA. The AP can allocate an RU to each of the multiple AIDs allocated to the one STA. The AP can transmit different frames using the RUs allocated to the multiple AIDs allocated to the one STA. The different frames can be frames of different types.

One STA can be allocated multiple AIDs by the AP. The one STA can be allocated an RU with respect to the multiple allocated AIDs. The one STA recognizes all of the RUs allocated to each of the multiple AIDs allocated to the STA itself as RUs allocated to the STA and can transmit one frame using the multiple allocated RUs. In addition, the one STA can transmit multiple frames using the multiple allocated RUs. At this time, the multiple frames can be transmitted with information indicating the AIDs associated with each of the allocated RUs described therein. The AP can transmit different frames using the RUs allocated to the multiple AIDs allocated to the one STA. The different frames can be frames of different types.

Hereinafter, the base station apparatus and the terminal apparatuses will be collectively referred to as radio communication apparatuses or communication apparatuses. In addition, information exchanged in a case that a certain radio communication apparatus performs communication with another radio communication apparatus will also be referred to as data. In other words, radio communication apparatuses include a base station apparatus and a terminal apparatus.

A radio communication apparatus includes any one of or both the function of transmitting a PPDU and a function of receiving a PPDU. FIG. 1 is a diagram illustrating examples of configurations of a PPDU transmitted by a radio communication apparatus. A PPDU that is compliant with the IEEE 802.11a/b/g standard includes L-STF, L-LTF, L-SIG, and a data frame (a MAC frame, a MAC frame, a payload, a data part, data, information bits, and the like). A PPDU that is compliant with the IEEE 802.11n standard includes L-STF, L-LTF, L-SIG, HT-SIG, HT-STF, HT-LTF, and a data frame. A PPDU that is compliant with the IEEE 802.11ac standard includes some or all of L-STF, L-LTF, L-SIG, VHT-SIG-A, VHT-STF, VHT-LTF, VHT-SIG-B, and a MAC frame. A PPDU studied in the IEEE 802.11ax standard includes some or all of L-STF, L-LTF, L-SIG, RL-SIG in which L-SIG is temporally repeated, HE-SIG-A, HE-STF, HE-LTF, HE-SIG-B, and a data frame. A PPDU studied in the IEEE 802.11be standard includes some or all of L-STF, L-LTF, L-SIG, RL-SIG, U-SIG, EHT-SIG, EHT-STF, EHT-LTF, and a Data frame.

L-STF, L-LTF, and L-SIG surrounded by the dotted line in FIG. 1 are configurations commonly used in the IEEE 802.11 standard (hereinafter, L-STF, L-LTF, and L-SIG will also be collectively referred to as an L-header). For example, a radio communication apparatus that is compliant with the IEEE 802.11a/b/g standard can appropriately receive an L-header inside a PPDU that is compliant with the IEEE 802.11n/ac standard. A radio communication apparatus that is compliant with the IEEE 802.11a/b/g standard can receive the PPDU that is compliant with the IEEE 802.11n/ac standard while considering it to be a PPDU that is compliant with the IEEE 802.11a/b/g standard.

However, because the radio communication apparatus that is compliant with the IEEE 802.11a/b/g standard cannot demodulate the PPDU that is compliant with the IEEE 802.11n/ac standard following the L-header, it is not possible to demodulate information about a transmitter address (TA), a receiver address (RA), and a duration/ID field used for configuring a NAV.

As a method for the radio communication apparatus that is compliant with the IEEE 802.11a/b/g standard to appropriately configure a NAV (or to perform a receiving operation for a prescribed period), IEEE 802.11 defines a method of inserting duration information to the L-SIG. Information about a transmission speed in the L-SIG (a RATE field, an L-RATE field, an L-RATE, an L_DATARATE, and an L_DATARATE field) and information about a transmission period (a LENGTH field, an L-LENGTH field, and an L-LENGTH) are used by the radio communication apparatus that is compliant with the IEEE 802.11a/b/g standard to appropriately configure a NAV.

Figure 2:
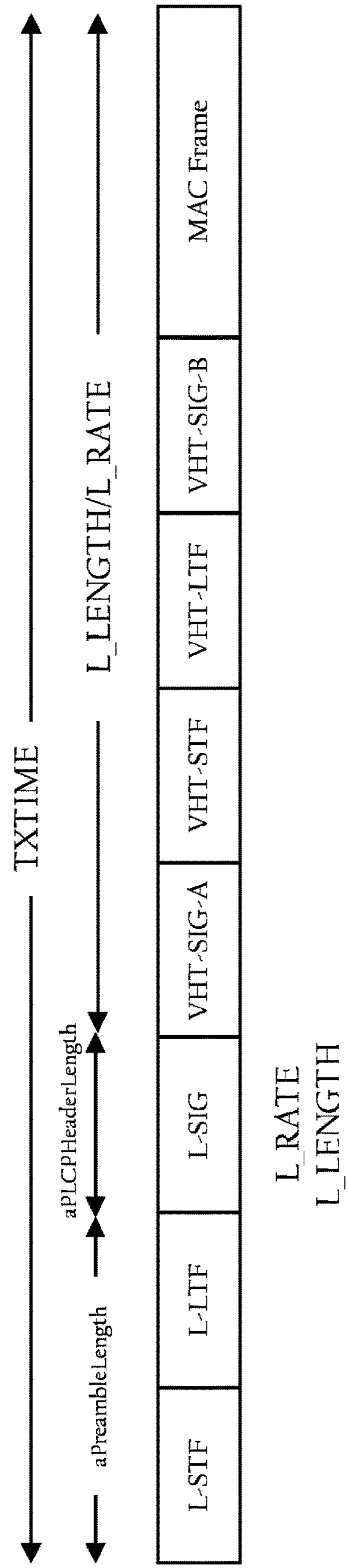
FIG. 2 is a diagram illustrating an example of a frame configuration according to an aspect of the present invention.

FIG. 2 is a diagram illustrating an example of a method for duration information inserted into an L-SIG. Although a PPDU configuration that is compliant with the IEEE 802.11ac standard is illustrated as an example in FIG. 2, a PPDU configuration is not limited thereto. A PPDU configuration that is compliant with the IEEE 802.11n standard and a PPDU configuration that is compliant with the IEEE 802.11ax standard may be employed. TXTIME includes information about a length of a PPDU, aPreambleLength includes information about a length of a preamble (L-STF+L-LTF), and aPLCPHeaderLength includes information about a length of a PLCP header (L-SIG). L_LENGTH is calculated based on Signal Extension that is a virtual period configured for compatibility with the IEEE 802.11 standard, $N_{ops}$ related to L-RATE, aSymbolLength that is information about one symbol (a symbol, an OFDM symbol, or the like), aPLCPServiceLength indicating the number of bits included in PLCP Service field, and aPLCPConvolutionalTailLength indicating the number of tail bits of a convolution code. The radio communication apparatus can calculate L_LENGTH and insert L_LENGTH into L-SIG. In addition, the radio communication apparatus can calculate L-SIG Duration. L-SIG Duration indicates information about a PPDU including L_LENGTH and information about a period that is the sum of periods of Ack and SIFS expected to be transmitted by the destination radio communication apparatus in response to the PPDU.

Figure 3:
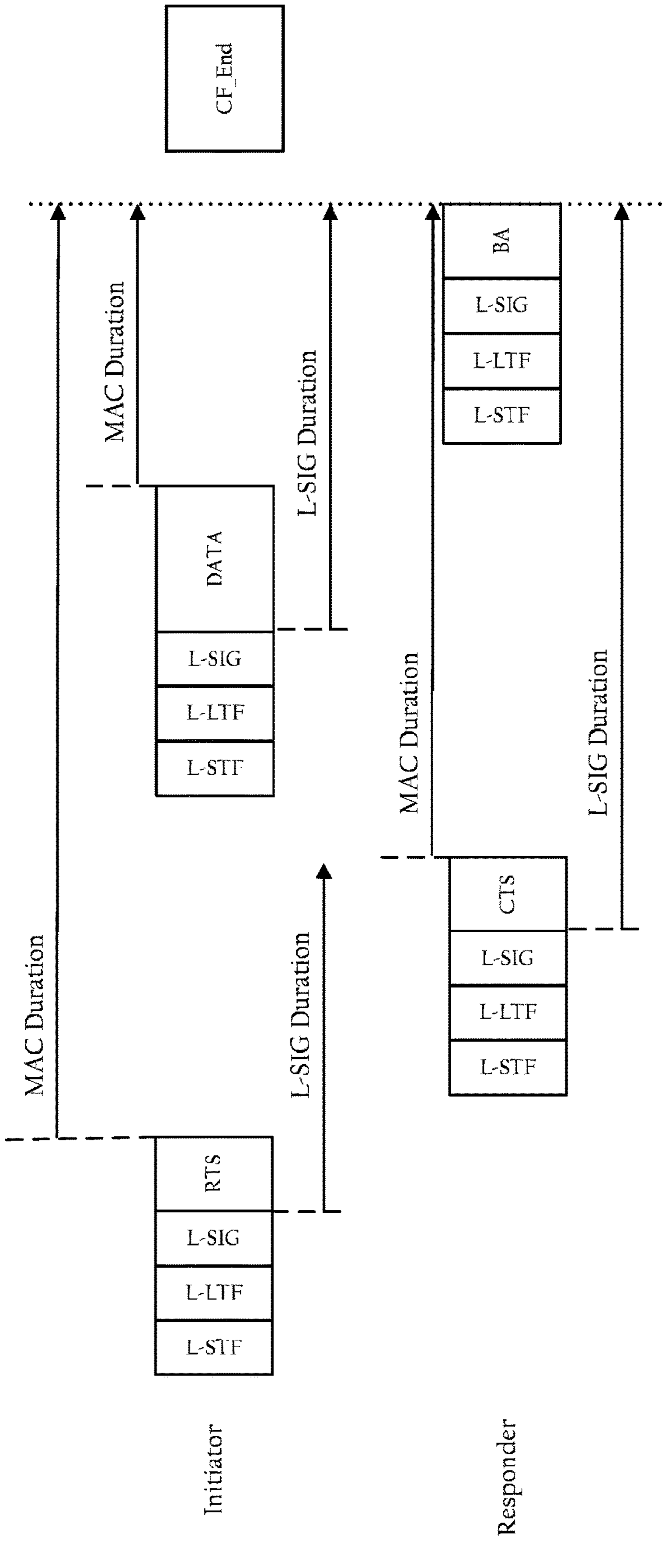
FIG. 3 is a diagram illustrating an example of communication according to an aspect of the present invention.

FIG. 3 is a diagram illustrating an example of L-SIG Duration in L-SIG TXOP Protection. DATA (a frame, a payload, data, and the like) include some of or both the MAC frame and the PLCP header. In addition, BA includes Block Ack or Ack. A PPDU includes L-STF, L-LTF, and L-SIG and can further include any one or more of DATA, BA, RTS, or CTS. Although L-SIG TXOP Protection using RTS/CTS is illustrated in the example illustrated in FIG. 3, CTS-to-Self may be used. Here, MAC Duration is a period indicated by a value of Duration/ID field. Furthermore, Initiator can transmit a CF_End frame for providing a notification regarding an end of the L-SIG TXOP Protection period.

Next, a method of identifying a BSS from a frame received by a radio communication apparatus will be described. In order for a radio communication apparatus to identify a BSS from a received frame, the radio communication apparatus that transmits a PPDU preferably inserts information for identifying the BSS (BSS color, BSS identification information, or a value unique to the BSS) into the PPDU. The information indicating the BSS color can be described in HE-SIG-A.

The radio communication apparatus can transmit L-SIG multiple times (L-SIG Repetition). For example, demodulation accuracy of L-SIG is improved by the radio communication apparatus on the reception side receiving L-SIG transmitted multiple times by using Maximum Ratio Combining (MRC). Moreover, in a case that reception of L-SIG has been properly completed using MRC, the radio communication apparatus can interpret the PPDU including the L-SIG as a PPDU that is compliant with the IEEE 802.11ax standard.

Even during the operation of receiving the PPDU, the radio communication apparatus can perform an operation of receiving part of a PPDU other than the corresponding PPDU (e.g., the preamble, L-STF, L-LTF, and the PLCP header prescribed by IEEE 802.11) (also referred to as a double-reception operation). In a case that a part of a PPDU other than the PPDU is detected during the operation of receiving the PPDU, the radio communication apparatus can update a part or an entirety of information about a destination address, a transmission source address, a PPDU, or a DATA period.

An Ack and a BA can also be referred to as a response (response frame). In addition, a probe response, an authentication response, and a connection response can also be referred to as a response.

1. First Embodiment

Figure 5:
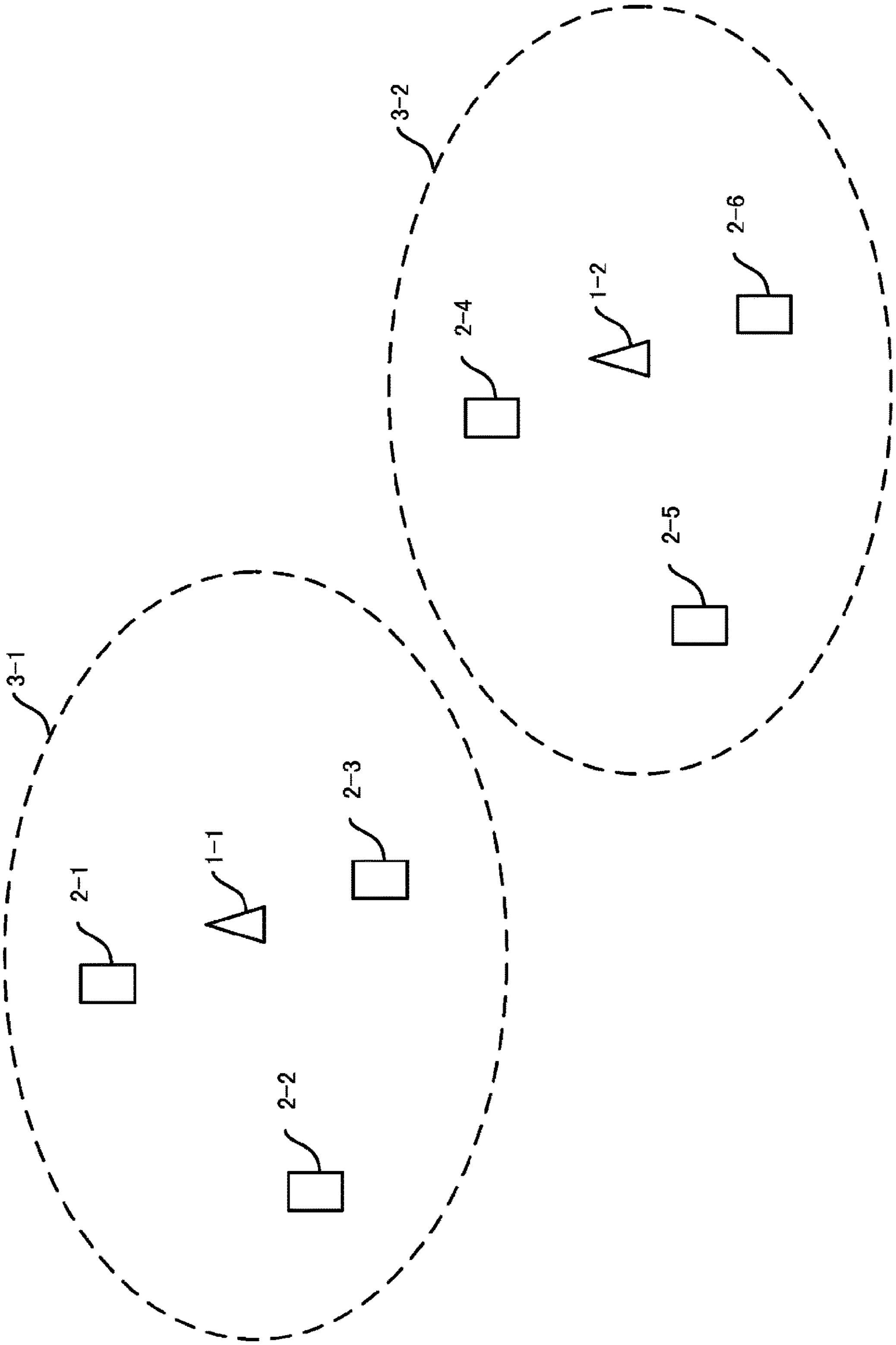
FIG. 5 is a diagram illustrating a configuration example of a communication system according to an aspect of the present invention.

FIG. 5 is a diagram illustrating an example of a radio communication system according to the present embodiment. A radio communication system 3-1 includes a radio communication apparatus 1-1 and radio communication apparatuses 2-1 to 2-3. Note that the radio communication apparatus 1-1 will also be referred to as a base station apparatus 1-1, and the radio communication apparatuses 2-1 to 2-3 will also be referred to as terminal apparatuses 2-1 to 2-3. In addition, the radio communication apparatuses 2-1 to 2-3 and the terminal apparatuses 2-1 to 2-3 will also be referred to as a radio communication apparatus 2A and a terminal apparatus 2A, respectively, as apparatuses associated to the radio communication apparatus 1-1. The radio communication apparatus 1-1 and the radio communication apparatus 2A are wirelessly connected and are in a state in which they can transmit and/or receive PPDUs to and from each other. Also, the radio communication system according to the present embodiment may include a radio communication system 3-2 in addition to the radio communication system 3-1. The radio communication system 3-2 includes a radio communication apparatus 1-2 and radio communication apparatuses 2-4 to 2-6. Note that the radio communication apparatus 1-2 will also be referred to as a base station apparatus 1-2 and the radio communication apparatuses 2-4 to 2-6 will also be referred to as terminal apparatuses 2-4 to 2-6. Also, the radio communication apparatuses 2-4 to 2-6 and the terminal apparatuses 2-4 to 2-6 will also be referred to as a radio communication apparatus 2B and a terminal apparatus 2B, respectively, as apparatuses associated to the radio communication apparatus 1-2. Although the radio communication system 3-1 and the radio communication system 3-2 form different BSSs, this does not necessarily mean that extended service sets (ESSs) are different. An ESS indicates a service set forming a local area network (LAN). In other words, radio communication apparatuses belonging to the same ESS can be regarded as belonging to the same network from a higher layer. Also, the BSSs are connected via a Distribution System (DS) and form an ESS. Note that each of the radio communication systems 3-1 and 3-2 can further include a plurality of radio communication apparatuses.

In FIG. 5, it is assumed that signals transmitted by the radio communication apparatus 2A reach the radio communication apparatus 1-1 and the radio communication apparatus 2B while the signals do not reach the radio communication apparatus 1-2 in the following description. In other words, in a case that the radio communication apparatus 2A transmits a signal using a certain channel, whereas the radio communication apparatus 1-1 and the radio communication apparatus 2B determine that the channel is busy, the radio communication apparatus 1-2 determines that the channel is idle. In addition, it is assumed that signals transmitted by the radio communication apparatus 2B arrive at the radio transmission apparatus 1-2 and the radio communication apparatus 2A, but do not arrive at the radio communication apparatus 1-1. In other words, in a case that the radio communication apparatus 2B transmits a signal using a certain channel, whereas the radio communication apparatus 1-2 and the radio communication apparatus 2A determine that the channel is busy, the radio communication apparatus 1-1 determines that the channel is idle.

A Multi Link Device (MLD) is a device capable of multi-link communication, and an access point apparatus corresponding to the MLD is referred to as an MLD access point apparatus, and a station apparatus corresponding to the MLD is referred to as an MLD station apparatus. The MLD access point apparatus and the MLD station apparatus are also collectively referred to as an MLD radio communication apparatus. In the present embodiment, the above-described radio communication apparatuses 1-1, 1-2, 2A, and 2B are described as MLD radio communication apparatuses. However, in actual operation, not all radio communication apparatuses in the radio communication system need support the MLD.

Figure 9:
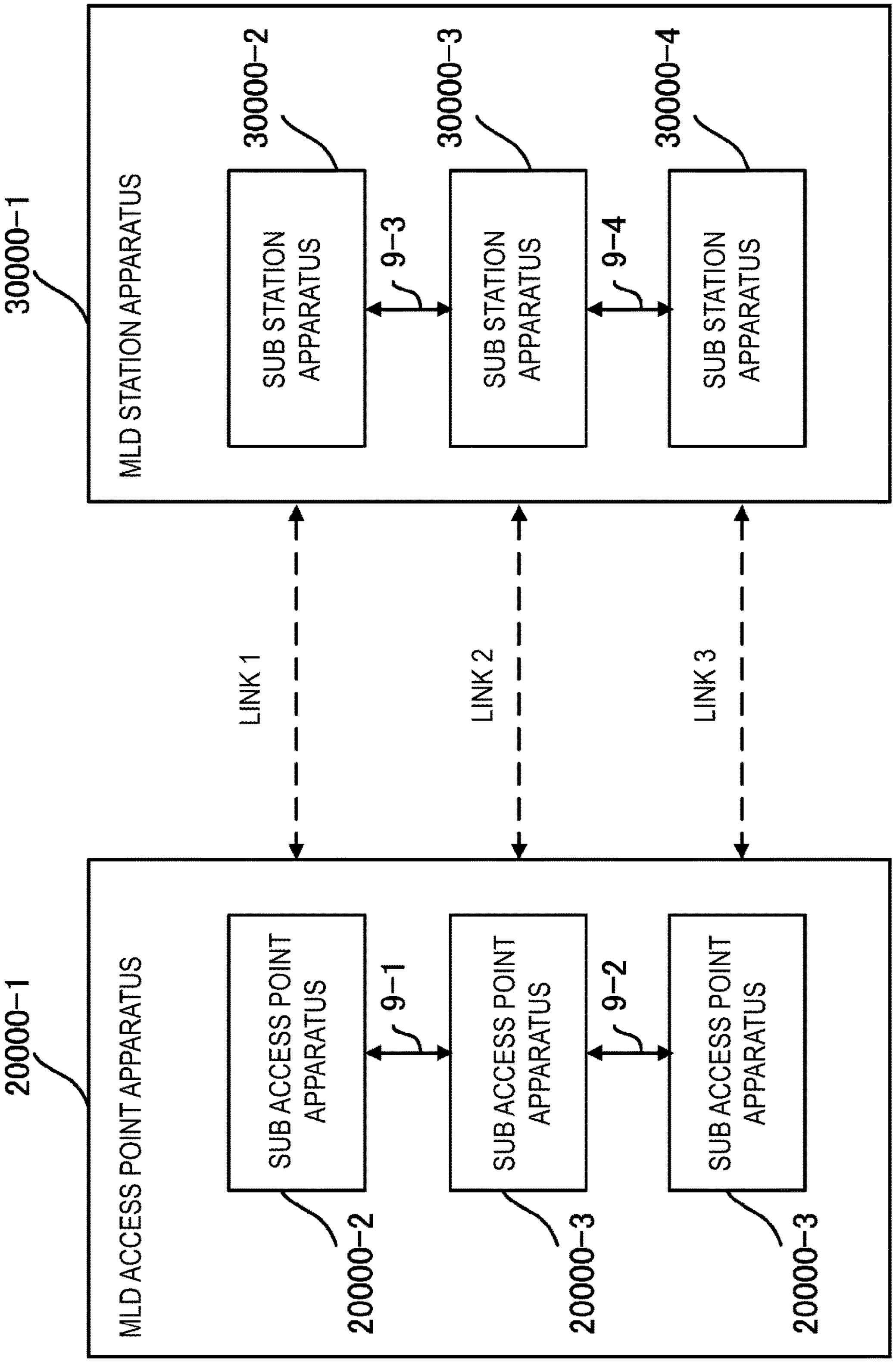
FIG. 9 is a block diagram illustrating a configuration example of a radio communication apparatus according to an aspect of the present invention.

An MLD access point apparatus 20000-1 and an MLD station apparatus 30000-1 will be described with reference to FIG. 9. The MLD radio communication apparatus includes multiple sub radio communication apparatuses corresponding to frequency bands (or channels or sub-channels) of links constituting the multi-link. FIG. 9 illustrates an example in which the MLD access point apparatus 20000-1 includes three sub radio communication apparatuses, in this case, three sub access point apparatuses (20000-2, 200000-3, and 20000-4), but the number of sub access point apparatuses is an arbitrary number of two or more. Similarly, although FIG. 9 illustrates an example in which the MLD station apparatus 30000-1 includes three sub radio communication apparatuses, in this case, three sub station apparatuses (30000-2, 300000-3, and 30000-4), the number of sub station apparatuses is an arbitrary number of two or more.

Note that the sub radio communication apparatus (sub access point apparatus, sub station apparatus, or the like) may include a part of a circuit in the radio communication apparatus, and may be referred to as a sub radio communication unit (sub access point unit, sub station unit).

FIG. 9 illustrates multiple sub radio communication apparatuses as logically separate blocks (squares) for the sake of explanation. Physically, a single radio communication apparatus may be provided. Alternatively, physically separate sub radio communication apparatuses may be configured, and in this case, each sub access point apparatus transmits and/or receives necessary information through connection lines 9-1 and 9-2, and each sub station apparatus transmits and/or receives necessary information through connection lines 9-3 and 9-4. The present embodiment mainly relates to the former case, in other words, a physically one radio communication apparatus (10000-1) is assumed to be provided, and the configuration will be described below with reference to FIG. 6 and FIG. 7.

Note that the number of sub access point apparatuses included in one MILD access point apparatus and the number of sub station apparatuses included in one MILD station apparatus vary depending on the grade, class, and capability of each MILD radio communication apparatus. An MLD radio communication apparatus of a higher grade, a higher class, or higher capability may be equipped with more sub radio communication apparatuses (sub access point apparatuses and sub station apparatuses). In other words, the sub radio communication apparatuses (sub access point apparatuses and sub station apparatuses) in each MLD radio communication apparatus located in one radio communication system vary depending on the grade, class, and capability, and the numbers of the apparatuses need not be the same.

The sub station apparatus 30000-2 is connected (associated) to the sub access point apparatus 20000-2 and establishes a link 1. The sub station apparatus 30000-3 is connected (associated) to the sub access point apparatus 20000-3 and establishes a link 2. The sub station apparatus 30000-4 is connected (associated) to the sub access point apparatus 20000-4 and establishes a link 3. In the description of the present embodiment, the number of links constituting the multi-link is three, but is not limited to this and may be any number. In the description of the present embodiment, the carrier frequency of the link 1 is assumed to be in the 2.4 GHz band, the carrier frequency of the link 2 is assumed to be in the 5 GHz band, and the carrier frequency of the link 3 is assumed to be in the 6 GHz band. However, the frequency used by each link can be arbitrarily configured from among the 2.4 GHz band, 5 GHz band, 6 GHz band, 60 GHz band, and other frequencies bands, channels, and sub-channels supported by the radio communication system, and may be changed according to the legal regulations of each country.

Figure 6:
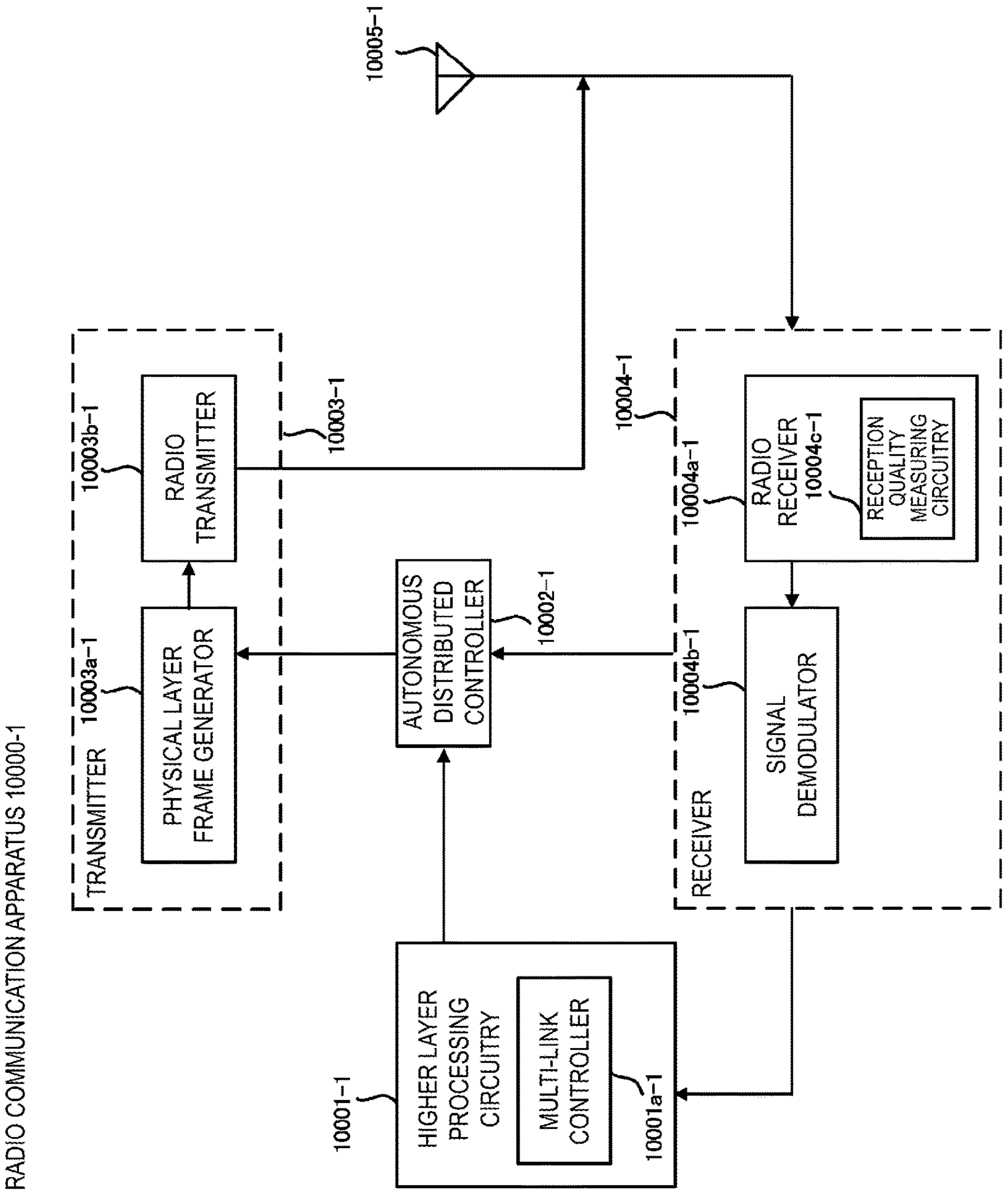
FIG. 6 is a block diagram illustrating a configuration example of a radio communication apparatus according to an aspect of the present invention.

FIG. 6 is a diagram illustrating an example of an apparatus configuration of the radio communication apparatus 10000-1. The radio communication apparatus 10000-1 includes a higher layer processing circuitry (higher layer processing step) 10001-1, an autonomous distributed controller (autonomous distributed control step) 10002-1, a transmitter (transmission step) 10003-1, a receiver (reception step) 10004-1, and an antenna 10005-1.

The higher layer processing circuitry 10001-1 performs information processing for layers higher than the physical layer, for example, the MAC layer and the LLC layer in regard to information (information related to a transmission frame, a Management Information Base (MIB), and the like) handled in the radio communication apparatus and a frame received from another radio communication apparatus. The multi-link controller 10001*a*-1 may be included in the higher layer processing circuitry 10001-1, but may be independent of the higher layer processing circuitry 10001-1.

The higher layer processing circuitry 10001-1 can notify the autonomous distributed controller 10002-1 of information related to a frame and a traffic transmitted to a radio medium. The information may be control information included in a management frame such as a beacon, for example, or may be measurement information reported by another radio communication apparatus to the radio communication apparatus. Moreover, the information may be control information included in a management frame or a control frame with the destination not limited (the information may be directed to the apparatus, may be directed to another apparatus, may be broadcasting, or may be multicasting).

Figure 7:
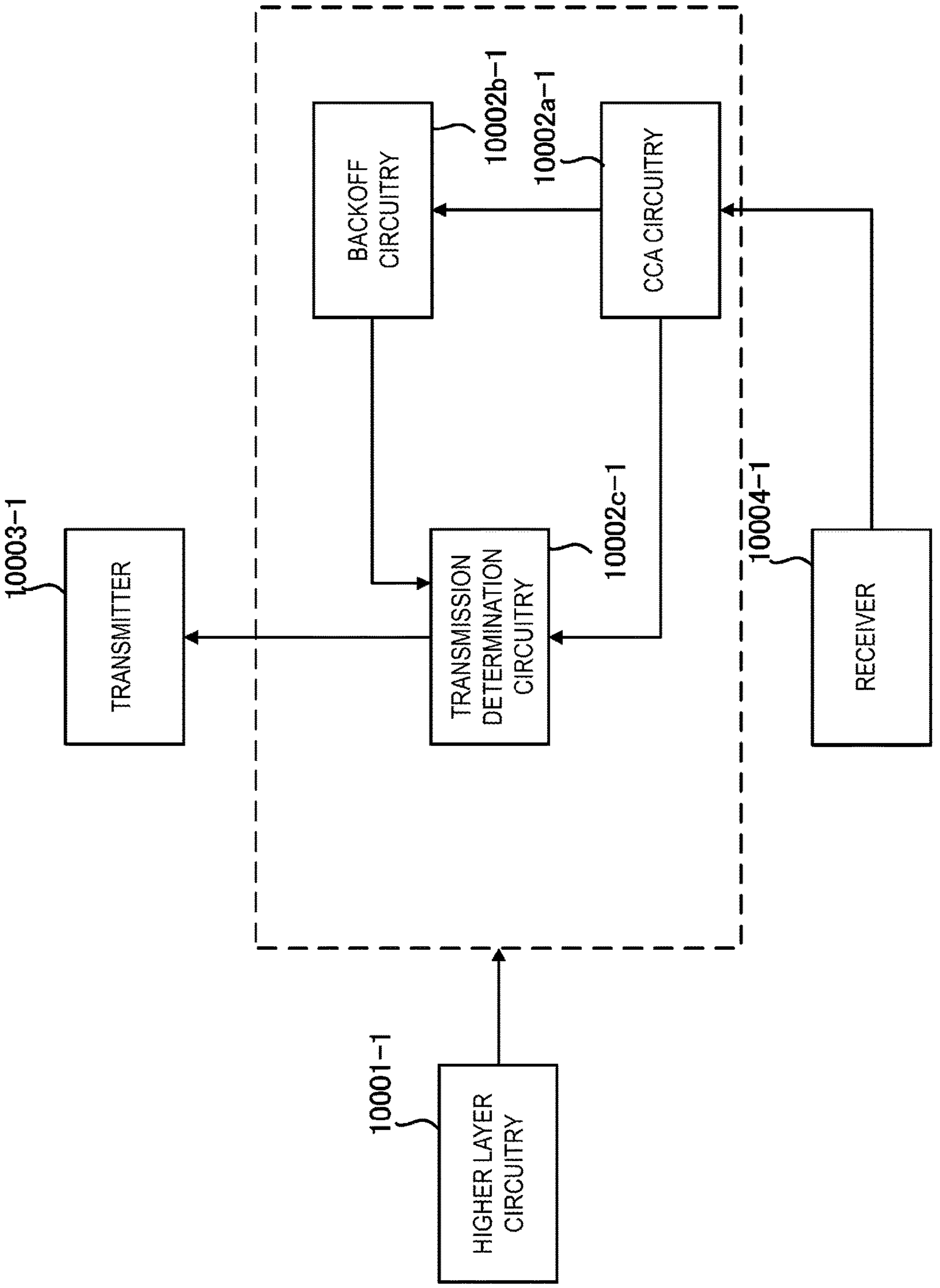
FIG. 7 is a block diagram illustrating a configuration example of a radio communication apparatus according to an aspect of the present invention.

FIG. 7 is a diagram illustrating an example of an apparatus configuration of the autonomous distributed controller 10002-1. The controller 10002-1 includes a CCA circuitry (CCA step) 10002*a*-1, a backoff circuitry (backoff step) 10002*b*-1, and a transmission determination circuitry (transmission determination step) 10002*c*-1.

The CCA processor 10002*a*-1 can perform determination of a state of a radio resource (including determination between a busy state and an idle state) using any one of or both information related to reception signal power received via the radio resource and information related to the reception signal (including information after decoding) provided as a notification from the receiver 10004-1. The CCA circuitry 10002*a*-1 can notify the backoff circuitry 10002*b*-1 and the transmission determination circuitry 10002*c*-1 of the state determination information of the radio resources.

The backoff circuitry 10002*b*-1 can perform backoff using the state determination information of the radio resources. The backoff circuitry 10002*b*-1 has a function of generating a CW and counting down it. For example, countdown of CW is performed in a case that the state determination information of the radio resources indicates idle, and the countdown of the CW can be stopped in a case that the state determination information of the radio resources indicates busy. The backoff circuitry 10002*b*-1 can notify the transmission determination circuitry 10002*c*-1 of the value of the CW.

The transmission determination circuitry 10002*c*-1 performs transmission determination using any one of or both the state determination information of the radio resources and the value of the CW. For example, the transmitter 10003-1 can be notified of transmission determination information in a case that the state determination information of the radio resources indicates idle and the value of the CW is zero. In addition, the transmitter 10003-1 can be notified of the transmission determination information in a case that the state determination information of the radio resources indicates idle.

The transmitter 10003-1 includes a physical layer frame generator (physical layer frame generation step) 10003*a*-1 and a radio transmitter (radio transmission step) 10003*b*-1. The physical layer frame generator 10003*a*-1 has a function of generating a physical layer frame (PPDU) based on the transmission determination information notified of from the transmission determination circuitry 10002*c*-1. The physical layer frame generator 10003*a*-1 performs error correction coding, modulation, precoding filter multiplication, and the like on transmission frames sent from the higher layer. The physical layer frame generator 10003*a*-1 notifies the radio transmitter 10003*b*-1 of the generated physical layer frame.

Figure 8:
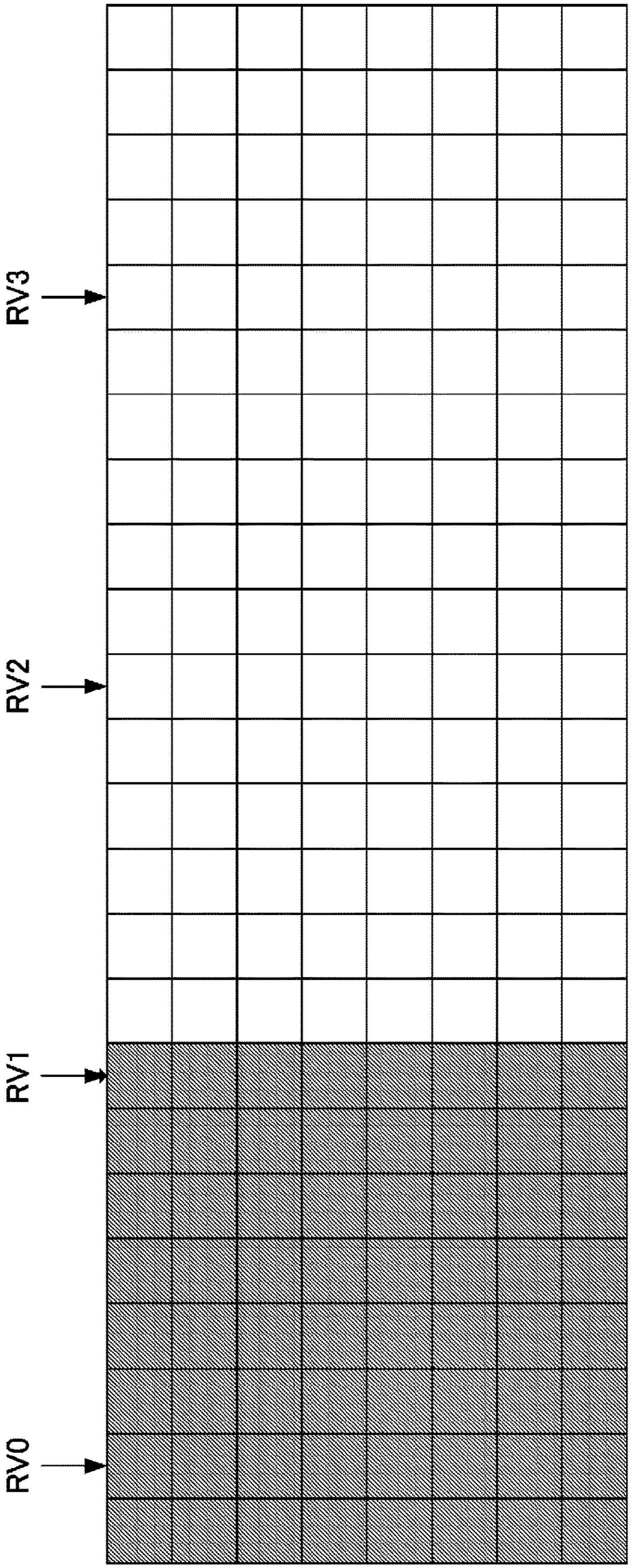
FIG. 8 is a schematic diagram illustrating an example of a coding scheme according to an aspect of the present invention.

FIG. 8 is a diagram illustrating an example of error correction coding performed by the physical frame generation circuitry according to the present embodiment. As illustrated in FIG. 8, an information bit (systematic bit) sequence is allocated in a hatched region, and a redundant (parity) bit sequence is allocated in a white blank region. A bit interleaver is appropriately applied to the information bits and to the redundant bits. The physical frame generation circuitry can read a necessary number of bits from the allocated bit sequence as a start position determined according to the value of a redundancy version (RV). By adjusting the number of bits, the coding rate can be flexibly changed, that is, puncturing can be performed. Note that FIG. 8 illustrates a total of four RVs but that the choices of RVs are not limited to a specific value in the error correction coding according to the present embodiment. The positions of the RVs need to be shared among the station apparatuses.

Although the physical layer frame generator performs error correction coding on the information bits transferred from the MAC layer, a unit in which error correction coding (coding block length) is performed is not limited. For example, the physical layer frame generator can divide the information bit sequence transferred from the MAC layer into information bit sequences having a predetermined length to perform error correction coding on each of the sequences, and thus can make the sequences into multiple coding blocks. Further, dummy bits can be inserted into the information bit sequence transferred from the MAC layer in a case that coding blocks are configured.

The frame generated by the physical layer frame generator **10003*a*-1 includes control information. The control information includes information indicating in which RU the data addressed to each radio communication apparatus is allocated (here, the RU including both frequency resources and spatial resources). In addition, the frame generated by the physical layer frame generator 10003*a*-1** includes a trigger frame for indicating frame transmission to the radio communication apparatus that is a destination terminal. The trigger frame includes information indicating the RU to be used by the radio communication apparatus that has received the indication for the frame transmission to transmit the frame.

The radio transmitter **10003*b*-1 converts the physical layer frame generated by the physical layer frame generator 10003*a*-1 into a signal in a radio frequency (RF) band to generate a radio frequency signal. Processing performed by the radio transmitter 10003*b*-1** includes digital-to-analog conversion, filtering, frequency conversion from a baseband to an RF band, and the like.

The receiver 10004-1 includes a radio receiver (radio reception step) **10004*a*-1, a signal demodulator (signal demodulation step) 10004*b*-1, and a reception quality measuring circuitry (reception quality measuring step) 10004*c*-1. The reception quality measuring circuitry 10004*c*-1 generates information related to reception quality from a signal in the RF band received by the antenna 10005-1. The information related to the signal quality includes a received power level, a Signal to Noise Ratio (SNR), and the like. The receiver 10004-1 may notify the autonomous distributed controller 10002-1 (in particular, the CCA part 10002*a*-1) and the higher layer processing circuitry 10001-1 (in particular, the multi-link controller 10001*a*-1**) of the information related to the reception quality and the information related to the reception signals.

The radio receiver **10004*a*-1 has a function of converting a signal in the RF band received by the antenna 10005-1 into a baseband signal and generating a physical layer signal (e.g., a physical layer frame). Processing performed by the radio receiver 10004*a*-1** includes frequency conversion processing from the RF band to the baseband, filtering, and analog-to-digital conversion.

The signal demodulator **10004*b*-1 has a function of demodulating a physical layer signal generated by the radio receiver 10004*a*-1. Processing performed by the signal demodulator 10004*b*-1 includes channel equalization, demapping, error correction decoding, and the like. The signal demodulator 10004*b*-1 can extract, from the physical layer signal, information included in the PHY header, information included in the MAC header, and information included in the transmission frame, for example. The signal demodulator 10004*b*-1 can notify the higher layer processing circuitry 10001-1 of the extracted information. Further, the signal demodulator 10004*b*-1** can extract any one or all of the information included in the PHY header, the information included in the MAC header, and the information included in the transmission frame.

The antenna 10005-1 includes a function of transmitting the radio frequency signal generated by the radio transmitter **10003*b*-1 to a radio space. Also, the antenna 10005-1 includes a function of receiving the radio frequency signal and passing the radio frequency signal to the radio receiver 10004*a*-1**.

The multi-link controller **10001*a*-1 receives the information related to the reception quality of the links (the frequency bands, the channels, and the sub-channels) from the reception quality measuring circuitry 10004*c*-1**, determines whether the respective links are good or bad, and determines which links are selected and used to form the multi-link. The information related to the reception quality includes a reception power level, a Signal to Noise Ratio (SNR), and the like, but is not limited thereto.

The radio communication apparatus 10000-1 can cause radio communication apparatuses in the surroundings of the radio communication apparatus 10000-1 to configure NAV corresponding to a period during which the radio communication apparatus uses a radio medium by describing information indicating the period in the PHY header or the MAC header of the frame to be transmitted. For example, the radio communication apparatus 10000-1 can describe the information indicating the period in a Duration/ID field or a Length field of the frame to be transmitted. The NAV period configured to radio communication apparatuses in the surroundings of the radio communication apparatus will be referred to as a TXOP period (or simply TXOP) acquired by the radio communication apparatus 10000-1. The radio communication apparatus 10000-1 that has acquired the TXOP will be referred to as a TXOP acquirer (TXOP holder). The type of frame to be transmitted by the radio communication apparatus 10000-1 to acquire TXOP is not limited to any frame type, and the frame may be a control frame (e.g., an RTS frame or a CTS-to-self frame) or may be a data frame.

The radio communication apparatus 10000-1 that is a TXOP holder can transmit the frame to radio communication apparatuses other than the radio communication apparatus during the TXOP. In a case that the radio communication apparatus 1-1 is a TXOP holder, the radio communication apparatus 1-1 can transmit a frame to the radio communication apparatus 2A during the TXOP period. In addition, the radio communication apparatus 1-1 can indicate to the radio communication apparatus 2A to transmit a frame addressed to the radio communication apparatus 1-1 during the TXOP period. The radio communication apparatus 1-1 can transmit, to the radio communication apparatus 2A, a trigger frame including information for indicating a frame transmission addressed to the radio communication apparatus 1-1 during the TXOP period.

The radio communication apparatus 1-1 may reserve a TXOP for the entire communication band (e.g., operation bandwidth) in which frame transmission is likely to be performed, or may reserve a TXOP for a specific communication band (Band) such as a communication band in which frames are actually transmitted (e.g., transmission bandwidth).

The radio communication apparatus that provides an indication for transmitting a frame in the TXOP period acquired by the radio communication apparatus 1-1 is not necessarily limited to radio communication apparatuses associated to the radio communication apparatus. For example, the radio communication apparatus can provide an indication for transmitting frames to radio communication apparatuses that are not associated to the radio communication apparatus in order to cause the radio communication apparatuses in the surroundings of the radio communication apparatus to transmit management frames such as a Reassociation frame or control frames such as an RTS/CTS frame.

Furthermore, TXOP in EDCA that is a data transmission method different from DCF will also be described. The IEEE 802.11e standard relates to EDCA and defines TXOP in terms of guaranty of Quality of Service (QoS) for various services such as video transmission and VoIP. The services are generally classified into four access categories, namely VOice (VO), VIdeo (VI), Best Effort (BE), and BacK ground (BK). In general, the services include VO, VI, BE, and BK with higher priority in this order. In each access category, there are parameters including a minimum value CWmin of CW, a maximum value CWmax of CW, Arbitration IFS (AIFS) as a type of IFS, and TXOP limit that is an upper limit value of a transmission opportunity, and values are set to have differences in priority. For example, it is possible to perform data transmission prioritized over the other access categories by setting a relatively small value for CWmin, CWmax, and AIFS of VO with the highest priority for the purpose of voice transmission as compared with the other access categories. For example, in a case of VI with a relatively large amount of transmission data to transmit a video, it is possible to extend a transmission opportunity as compared with the other access categories by configuring TXOP limit to be large. In this manner, four parameter values of the access categories are adjusted for the purpose of guaranteeing QoS in accordance with various services.

In the present embodiment, the signal demodulator of the station apparatus can perform a decoding processing on the received signal in the physical layer, and perform error detection. Here, the decoding processing includes decoding processing of codes that have been error-corrected which is applied to the received signal. Here, the error detection includes error detection using an error detection code (e.g., a cyclic redundancy check (CRC) code) added to the received signal in advance, and error detection using an error detection code (e.g., low-density parity-check code (LDPC)) having an error detection function from the first. The decoding processing in the physical layer can be applied for each coding block.

The higher layer processing circuitry transfers the result of decoding of the physical layer by the signal demodulator to the MAC layer. In the MAC layer, the signal of the MAC layer is restored from the transferred decoding result of the physical layer. Then, error detection is performed in the MAC layer, and it is determined that whether the signal of the MAC layer transmitted by the station apparatus as a transmission source of the reception frame has been correctly restored.

Figure 10:
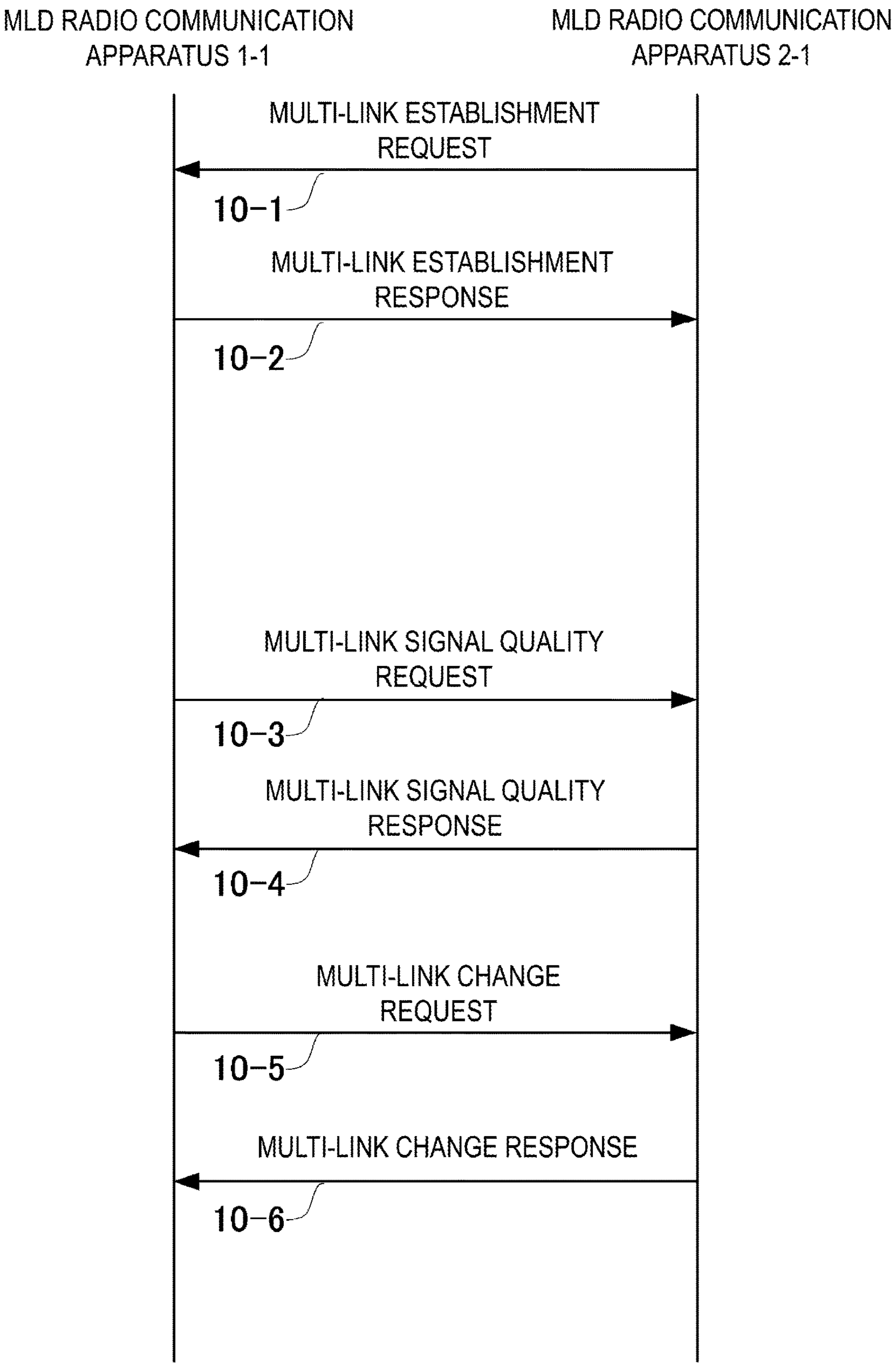
FIG. 10 is a diagram illustrating frame transmission and/or reception according to an aspect of the present invention.

FIG. 10 illustrates an outline of a procedure related to the multi-link of the present embodiment by using an MLD radio communication apparatus 1-1 (referred to as the MLD access point apparatus herein) and an MLD radio communication apparatus 2-1 (referred to as the MLD station apparatus herein) as examples of radio communication apparatuses. In this case, the MLD radio communication apparatus 2-1 that transmits a multi-link establishment request 10-1 is referred to as a multi-link initiator, and the multi-link establishment request 10-1 is transmitted to the MLD radio communication apparatus 1-1. The multi-link establishment request may include control information such as multi-link capability information (Capability information) of the subject radio communication apparatus and multi-link operation mode information regarding the multi-link requested to be established. The multi-link measurement information (Measurement information) may be included in the multi-link establishment request, or may be reported to the MLD radio communication apparatus 1-1 separately from the multi-link establishment request. Note that the multi-link initiator may be the MLD radio communication apparatus 1-1 instead of the MLD radio communication apparatus 2-1.

The multi-link capability information may include information such as channel information (frequency, bandwidth, and the like) regarding channels usable by the subject radio communication apparatus, the availability of STR (Simultaneously Transmission and Reception), the availability of frame synchronization, the availability of multi-link aggregation, the availability of a multi-link switch, and multi-link TXOP (maximum value, minimum value, and the like). The multi-link operation mode information may include channel information (frequency, bandwidth, and the like) regarding channels of each of the links constituting the multi-link, a multi-link TXOP limit, multi-link aggregation, multi-link switch, frame synchronization, frame asynchronization, STR, non-STR, a response frame scheme (response frame connection information, response frame timing information, and the like), response frame parameters (such as frame length threshold, response frame transmission time limit), and the like.

The MLD radio communication apparatus 2-1 serving as a multi-link initiator may measure the radio signal quality of the frequency band (or channel, or sub-channel) usable by the subject radio communication apparatus, include a measurement result in the multi-link establishment request as multi-link measurement information to report the result to the MLD radio communication apparatus 1-1. The receiver of the sub station apparatus constituting the MLD radio communication apparatus 2-1 independently performs the measurement, and the higher layer processing circuitry notified of the measurement value may handle the measurement value for each sub radio communication apparatus or may collectively handle the measurement values of all the sub station apparatuses. Examples of the radio signal quality include a reception power level and a Signal to Noise Ratio (SNR), but is not limited thereto. The radio signal quality may be any value that can be used to determine whether the signal quality is good or poor or used as an index about the signal quality. The measured object for which the received power level or the SNR is measured may be a broadcast frame such as a beacon transmitted by each sub access point apparatus constituting the MLD radio communication apparatus 1-1. Since the broadcast frame is broadcast to the radio communication apparatus 2A to be connected to the MLD radio communication apparatus 1-1, each radio communication apparatus 2A can measure the radio signal quality of the same frame, and the reception qualities of the radio communication apparatuses 2A may be compared with one another. In addition to the beacon, a management frame or a control frame that is broadcast or multicast may be used as a measured object.

The measured object may be a multicast frame transmitted by the MLD radio communication apparatus 1-1 to the radio communication apparatus 2A belonging to a specific group. Also in this case, the radio communication apparatuses 2A belonging to the specific group can measure the radio signal quality of the same frame, and this is convenient for comparing the reception qualities of the radio communication apparatuses 2A with one another.

In a case that the MLD radio communication apparatus 1-1 need not compare the reception qualities of the multiple radio communication apparatuses 2A with one another, the unicast frame may be used as the measured object. In this case, the MLD radio communication apparatus 1-1 can also perform radio quality measurement on a frame to which antenna directivity control is applied for radio communication apparatus 2A. In other words, the radio quality can be measured in consideration of the antenna directivity capability of the radio circuitry for each frequency band (or channel, or sub-channel).

The multi-link establishment request may be transmitted independently and separately on each link, or may be transmitted on one of the links constituting the multi-link. The multi-link establishment request may be transmitted independently and separately on each link, or may be transmitted on one of the links constituting the multi-link (in a case that no multi-link measurement information is included in the multi-link establishment request). In a case that such transmission is performed on one of the links, the one link for performing frame transmission and/or reception for multi-link management is also referred to as a multi-link management link.

In response to receiving the multi-link establishment request, the MLD radio communication apparatus 1-1 transmits a multi-link establishment response to the MLD radio communication apparatus 2-1. The multi-link establishment response 10-2 may include control information such as multi-link capability information of the subject radio communication apparatus, establishment state information indicating whether multi-link establishment has succeeded, a multi-link ID used to identify the multi-link, and multi-link operation mode information. The multi-link ID may be a Traffic ID (TID) or may be a value based on the TID. The multi-link operation mode information included in the multi-link establishment response may be finally determined based on the multi-link operation mode included in the multi-link establishment request received from the MLD radio communication apparatus 2-1 and the multi-link operation mode that can be provided by the radio communication apparatus 1-1. The multi-link operation mode information may include information regarding a frequency band (or channel, or sub-channel) used in the established multi-link communication. In a case that the establishment state information indicates success, the multi-link is established that conforms to the multi-link operation mode information included in the multi-link establishment response. In a case that the establishment status information indicates failure, the multi-link cannot be established.

The method for determining the information of the frequency band (or channel, or sub-channel) used will be further described, information being included in the multi-link operation mode information of the multi-link establishment response described in the preceding paragraph. For the above-described determination method, the MLD radio communication apparatus 2-1 may have at least two multi-link policies generally classified. One of the multi-link policies is a Best Effort method, and the other is an Admission Control method. The radio communication system including the MLD radio communication apparatus 1-1 may be operated by one of the multi-link policies. As another method, the different multi-link policy may be applied to each MLD radio communication apparatus for operation; the best effort scheme is applied to some of the MLD radio communication apparatuses 2A connected to the MLD radio communication apparatus 1-1 and the admission control scheme is applied to others of the MLD radio communication apparatuses 2A. The MLD radio communication apparatus 1-1 may use broadcast information such as a beacon to notify the MLD radio communication apparatus 2A of which multi-link policy is to be selected. Alternatively, internal information such as the MIB may be used to indicate the multi-link policy to the MLD radio communication apparatus 1-1, which may follow the multi-link policy.

The MLD radio communication apparatus 1-1 receives the multi-link measurement information reported by the MLD radio communication apparatus 2-1. In the best effort scheme, all requested links may be allowed to be established regardless of whether the reception quality of each frequency band (or channel, or sub-channel) reported by the MLD radio communication apparatus 2-1 is good or poor.

In the admission control scheme, the MLD radio communication apparatus 2-1 holds a threshold related to the reception quality (referred to as a quality threshold), and allows multi-link establishment using only links having good quality exceeding the quality threshold. For example, in a case that the quality threshold is Q_th and that of the three links requested in the multi-link establishment request, link 1 and link 2 have good signal quality exceeding Q_th, whereas link 3 has poor signal quality below Q_th, the operation mode information of the multi-link establishment response may indicate that multi-link establishment using only the two links of link 1 and link 2 is allowed.

Although an example in which a common quality threshold Q_th is used for all requested links and frequency bands (or channels or subchannels) has been described in the preceding paragraph, the quality threshold may be configured to a different value for each link and for each frequency band (or channel or subchannel). The quality threshold may be configured to different values for the respective links, for example, the quality threshold is configured to Q_th1 for link 1, to Q_th2 for link 2, and to Q_th3 for link 3.

A combination of the thresholds, that is, a combination of Q_th1, Q_th2, and Q_th3 is defined as Q_th_1. Several types of combinations can be configured, and these combinations are herein represented as Q_th_x (x is an integer of 1, 2, 3, . . . ). In the admission control scheme, several combinations of quality thresholds may be provided. For example, three types of combinations of Q_th_1, Q_th_2, and Q_th_3 may be provided, and the MLD radio communication apparatuses may be categorized into groups such as a group of MLD radio communication apparatuses using Q_th_1, a group of MLD radio communication apparatuses using Q_th_2, and a group of MLD radio communication apparatuses using Q_th_3.

As described above, in the admission control scheme, the quality threshold may be varied for operation. In a case that the admission control type is used for operation, the MLD radio communication apparatus 1-1 checks the multi-link measurement information reported by the sub station apparatus included in the MLD radio communication apparatus 2-1. In a case that the quality is lower than a prescribed threshold, the MLD radio communication apparatus 1-1 can reject connection of the corresponding link.

As described above, even in a case that all the links and frequency bands (or channels or sub-channels) constituting the multi-link is evaluated for quality, links having good quality are selected, multi-link communication is established (set up), and the communication is started, the radio environment may change after the setup. For example, in a case that the radio environment changes due to movement of the terminal apparatus or movement of a person or an object within the coverage of the radio communication system, the quality of a certain link may be degraded. As a result, the effect of the multi-link connection may fail to be obtained, and large-capacity communication or low-latency communication may fail to be realized. As described above, in the existing mechanism, the effect of the multi-link communication may fail to be obtained due to the above-described factors.

Accordingly, the MLD radio communication apparatus 1-1 may check the quality of each link with a prescribed interval after multi-link establishment (setup). The MLD radio communication apparatus 1-1 transmits a multi-link signal quality request 10-3 to the MLD radio communication apparatus 2-1. The MLD radio communication apparatus 2-1 measures the radio signal quality of target links (frequency bands, channels, or subchannels), i.e., link 1, link 2, and link 3 in this example, and reports the radio signal quality to the MLD radio communication apparatus 1-1 as a multi-link signal quality response 10-4. The MILD radio communication apparatus 1-1 evaluates the signal quality of each link according to the multi-link policy of the MLD radio communication apparatus 1-1. In other words, a link whose quality is lower than a prescribed quality threshold is determined to have poor radio quality, and the link is prohibited from being used for transmission by the MLD radio communication apparatus 2-1 (however, reception is still enabled for the evaluation of the link for the radio signal quality). This is referred to as disabling (invalidating) the link. On the other hand, even in a case that the link is disabled at the time of establishment (setup) of multi-link communication, the MLD radio communication apparatus 1-1 enables the link to allow transmission by the MLD radio communication apparatus 2-1 on the link in a case that a multi-link quality check after multi-link establishment indicates that the signal quality exceeds the prescribed quality threshold. Note that the MLD radio communication apparatus 2-1 may spontaneously transmit the multi-link signal quality response 10-4 without receiving the multi-link signal quality request 10-3.

Even in a case that a link having quality lower than the prescribed quality threshold as described in the preceding paragraph is determined to have poor radio quality, instead of prohibiting (disabling) the MLD radio communication apparatus 2-1 from performing transmission using the link, only frames in low-priority access categories (BK, BE, etc.) in the EDCA of the IEEE 802.11e standard may be allowed to be transmitted or transmission of frames in high-priority access categories (VO, VI, etc.) may be disallowed. Alternatively, only frames in high-priority access categories (VO, VI, and the like) of the EDCA may be allowed to be transmitted, or transmission of frames in low-priority access categories (BK, BE, and the like) may be disallowed. Not limited to these, whether frame transmission is allowed or disabled may be determined according to the priorities of the EDCA.

The MLD radio communication apparatus 1-1 may transmit a multi-link change request 10-5 to the MLD radio communication apparatus 2-1. The multi-link change request 10-5 may include above-described contents regarding whether the link is enabled or disabled. The MLD radio communication apparatus 2-1 may transmit a multi-link change response 10-6 as a response to the multi-link change request 10-5. The multi-link change response 10-6 may include information related to the link that has been determined to be enabled or disabled (information such as a pause time, a wake-up time, an active state, or an inactive state for the link).

Note that the multi-link signal quality request may be transmitted aperiodically. In a case that the multi-link policy is of the best effort type, the multi-link signal quality request processing after multi-link establishment may be omitted. The quality threshold used for admission control may also be included in the multi-link policy. Apart from the inclusion of the quality threshold in the multi-link policy, the MLD radio communication apparatus 1-1 may notify the MLD radio communication apparatus 2A of the quality threshold by using broadcast information such as a beacon, or the MLD radio communication apparatus 1-1 may handle the quality threshold as internal information such as the MIB.

2. Second Embodiment

The configurations of a radio communication system and an MLD radio communication apparatus in a second embodiment are similar to those in the first embodiment. In the first embodiment, after multi-link establishment (setup), the MLD radio communication apparatus 1-1 (referred to as the MLD access point apparatus herein) transmits a multi-link signal quality request frame, and the MLD radio communication apparatus 2-1 (referred to as the MLD station apparatus herein) measures the signal quality status of each of the links constituting the multi-link and reports the signal quality status to the MLD radio communication apparatus 1-1. The measured object is a broadcast frame such as in a beacon, or a management frame or a control frame broadcast or subjected to multicasting by using a signal other than the beacon. In the second embodiment, the MLD radio communication apparatus 1-1 transmits a multi-link signal quality check frame to the MLD radio communication apparatus 2-1 by unicast, and the signal quality of the connected MLD radio communication apparatus can be checked and the demodulation capability of the MLD radio communication apparatus can be estimated depending on whether a response frame (control frame such as Ack or BlockAck) to the multi-link signal quality check frame can be received. The multi-link signal quality check frame may be separately transmitted to each link for quality check of the link (each frequency band, each channel, or each sub-channel).

Figure 11:
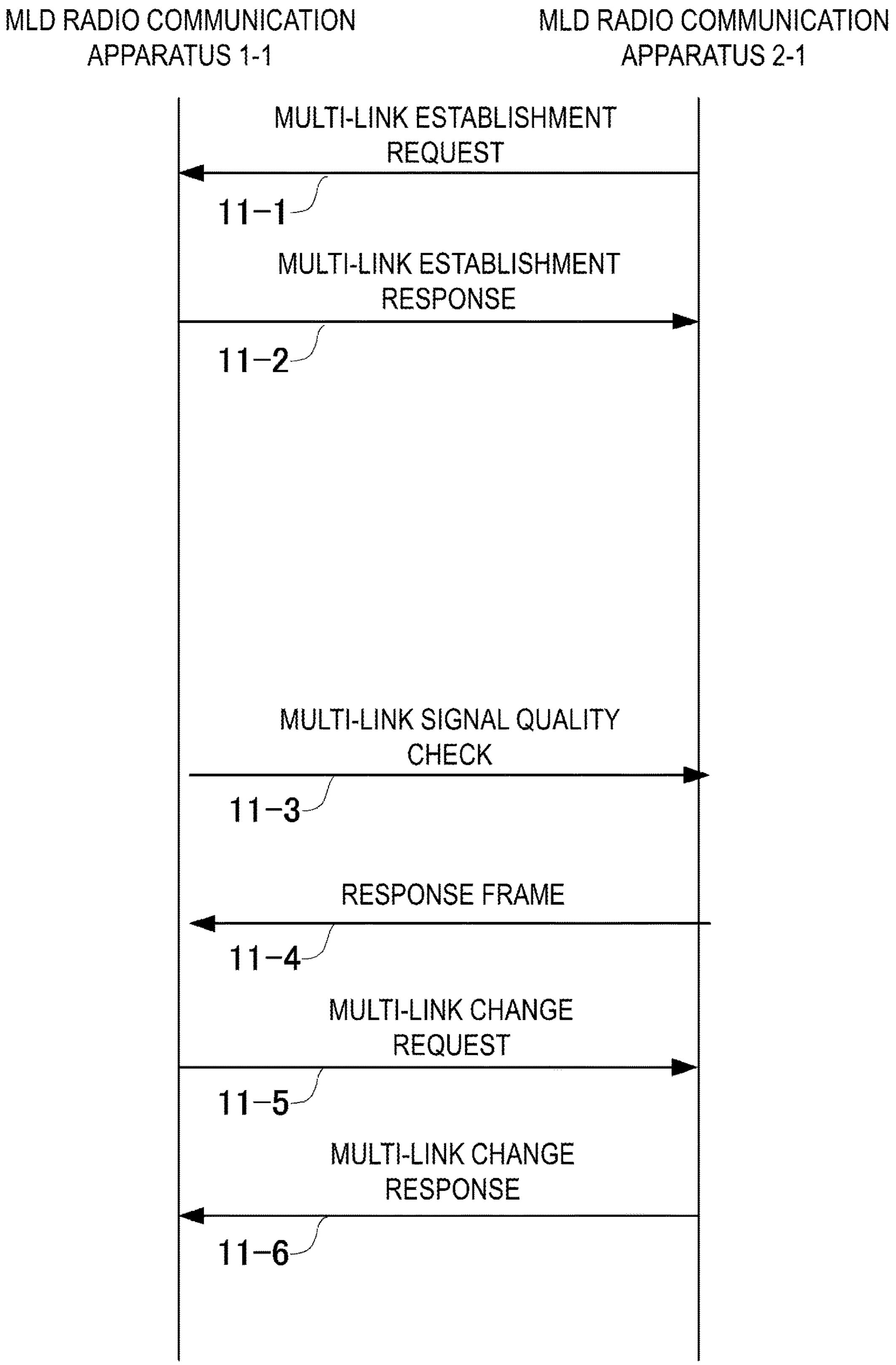
FIG. 11 is a diagram illustrating frame transmission and/or reception according to an aspect of the present invention.

This will be described with reference to FIG. 11. Similarly to the first embodiment and the like, the MLD radio communication apparatus 1-1 is assumed to transmit a multi-link establishment request 11-1, and the MLD radio communication apparatus 2-1 is assumed to receive the multi-link establishment request and to transmit a multi-link establishment response 11-2. The multi-link policy of the radio communication system may include the modulation scheme, the coding rate, the frame length, the number of frame aggregations, and the like in the signal quality check 11-3 transmitted by the MLD radio communication apparatus 1-1 for multi-link quality check. The MLD radio communication apparatus 1-1 may notify the multi-link policy to the MLD radio communication apparatus 2A by using broadcast information such as a beacon. Alternatively, internal information such as the MIB may be used to indicate the multi-link policy to the MLD radio communication apparatus 1-1, which may follow the multi-link policy. Alternatively, separately from the multi-link policy, the MLD radio communication apparatus 1-1 may notify the MLD radio communication apparatus 2A of the multi-link policy by using broadcast information such as a beacon, or the MLD radio communication apparatus 1-1 may handle the multi-link policy as internal information such as the MIB.

A combination of the modulation scheme and the coding rate is also referred to as a Modulation and Coding Scheme (MCS). In the first embodiment, in a case that the measured object is a beacon, the beacon generally provides a wide coverage in a case of being configured with the lowest one of the MCSs supported by the radio communication system. The second embodiment is characterized in that a multi-link signal quality check frame 11-3 dedicated for multi-link quality check is used and that the MCS in the frame can be configured in accordance with the multi-link policy. In a case that high quality is required for each of the links constituting the multi-link, the multi-link signal quality check frame is configured with a high MCS. In the multi-link signal quality check frame, a lower MCS is configured for a lower quality required.

In a case that the MLD radio communication apparatus 2-1 transmits a response frame 11-4 in response to a frame with a high MCS transmitted by the MLD radio communication apparatus 1-1 and the content of the response frame 11-4 indicates successful reception, the radio quality can be determined to be good. On the other hand, in a case that the MLD radio communication apparatus 2-1 fails to transmit the response frame (11-4) or in a case that the MLD radio communication apparatus 2-1 can transmit the response frame (11-4) but the content of the response frame indicates failed reception, the radio quality can be determined to be poor.

Depending on the multi-link policy, the MLD radio communication apparatus 1-1 can also change the frame length and the number of frame aggregations for the frame of the multi-link signal quality check 11-3. Even with the same MCS, a longer frame length or a larger number of frame aggregations makes demodulation more difficult. Therefore, in a case that the MLD radio communication apparatus 2A transmits the response frame 11-4 in response to the frame of the multi-link signal quality check 11-3 having a long frame length and transmitted by the MLD radio communication apparatus 1-1 and the content of the response frame 11-4 indicates successful reception, the radio quality can be determined to be good. On the other hand, in a case that the MLD radio communication apparatus 2-1 fails to transmit the response frame (11-4) or in a case that the MLD radio communication apparatus 2-1 can transmit the response frame (11-4) but the content of the response frame indicates failed reception, the radio quality can be determined to be poor.

The signal quality check frame may be transmitted in each link (or one or more links constituting the multi-link) with a prescribed interval. The transmission may be triggered by the MLD radio communication apparatus determining that the corresponding link quality has been degraded. For example, transmission of the signal quality check frame may be triggered by the MLD radio communication apparatus 2-1 (MLD station apparatus) reporting that the signal quality is lower than the prescribed quality threshold according to the first embodiment, and depending on the reception quality of a response frame, the link may be determined to be disabled (invalidated) or kept enabled (kept validated).

The MLD radio communication apparatus 1-1 transmits the multi-link change request 11-5 to the MLD radio communication apparatus 2-1. The multi-link change request 11-5 may include contents regarding whether the link is enabled or disabled as described above. The MLD radio communication apparatus 2-1 may transmit a multi-link change response 11-6 as a response to the multi-link change request 11-5. The multi-link change response 11-6 may include information related to the link that has been determined to be enabled or disabled (information such as a pause time, a wake-up time, an active state, or an inactive state for the link).

The signal quality check frame is used to check the quality of each of the links constituting the multi-link. The purpose of use of the signal quality check frame is to detect degraded quality of a certain link and improved quality of a certain link due to a change in the radio environment caused by movement of the terminal apparatus or the like after multi-link establishment (setup). Continuing the quality check allows good links for the multi-link communication to be held, consequently improving the effect of the multi-link connection, that is, the possibility of achieving the large-capacity communication or the low-latency communication.

3. Third Embodiment

3.1. Background Art

The Institute of Electrical and Electronics Engineers Inc. (IEEE) has been continuously working on updating of the IEEE 802.11 specification that is a wireless Local Area Network (LAN) standard in order to achieve an increase in speed and frequency efficiency of the wireless LAN network. The recent rapid spread of wireless LAN devices is expected to expand the usage of wireless LAN devices as real-time applications such as remote medical care and VR/AR, and efforts are being made to standardize IEEE 802.11be to realize a further reduction in latency and a further increase in communication capacity in the IEEE 802.11ax standard.

In the IEEE 802.11 standard, error control is introduced as a technique for increasing the throughput. Error control is roughly divided into Forward Error Correction (FEC) and Automatic repeat request (ARQ). The forward error correction is a scheme in which an error occurring in a transmission path is corrected on a reception side using an error correction code, and eliminates the need for a retransmission request to retransmit an erroneous packet to a transmission side. The error correction capability is improved by increasing the ratio of redundant bits occupying a codeword. However, there is a trade-off relationship between the error correction capability and an increased amount of decoding processing, reduced transmission efficiency, or the like. On the other hand, ARQ is a scheme for requesting the transmission side to retransmit a packet that has not been properly decoded by the reception side. At the time of decoding, a packet error is detected by Medium Access Control (MAC) on the reception side, and the packet is discarded without being accumulated in a buffer. An Acknowledgement (ACK) is transmitted to the transmission side in a case that the packet is successfully decoded, and a Negative Acknowledgement (NACK) is transmitted to the transmission side in a case that a packet error is detected. Packet retransmission processing is performed by ARQ in a case that the NACK is transmitted to the transmission side or the ACK is not transmitted to the transmission side within a prescribed period. In addition to the error control in the above-mentioned IEEE 802.11 standard, Hybrid ARQ (HARQ) corresponding to a combination of a forward error correction code and ARQ has been studied in IEEE 802.11be standardization activities. For the HARQ, wide studies have been conducted about chase combining in which at the time of retransmission, the same packet is transmitted to allow the reception side to perform packet combining to improve a Signal to Noise power ratio (SNR) of a received signal and Incremental Redundancy (IR) in which at the time of retransmission, a redundant signal (parity signal) is newly transmitted to improve an error correction decoding capability on the reception side.

In the standards succeeding IEEE 802.1 in, aggregation of a radio frame and aggregation of an ACK has been introduced as a technology for increasing throughput by reducing the overheads on the MAC layer. The aggregation of radio frames is roughly classified into Aggregated MAC Service Data Unit (A-MSDU) and Aggregated MAC Protocol Data Unit (A-MPDU). The aggregation of radio frames allows many packets to be transmitted at a time to improve transmission efficiency while increasing the possibility of transmission errors. Thus, in the standards succeeding IEEE 802.11ax, as an elemental technology for increasing the throughput, the aggregation of radio frames is expected not only to improve transmission efficiency but also to provide efficient error control for each MPDU. Accordingly, in the IEEE 802.11be standardization activities, time diversity obtained by the HARQ is expected to improve transmission quality.

3.2. Citation List

NPL 1: IEEE 802.11-19/1578-00-0be, September 2019
NPL 2: IEEE 802.11-20/482-01-0be, June 2020

3.3. Technical Problem

However, since the existing IEEE 802.11 standards do not consider the packet combining based on the HARQ, there is a problem that applying efficient packet combining is difficult.

An aspect of the present invention has been made in view of such circumstances, and an object thereof is to disclose a communication apparatus and a communication method that enable, in the IEEE 802.11 standard, efficient packet combining at the time of retransmission, contributing to improvement of a reception SNR.

3.4. Solution to Problem

The communication apparatus and the communication method according to an aspect of the present invention for solving the aforementioned problem are as follows.

(1) Specifically, an aspect of the present invention provides a communication apparatus for transmitting a frame, the communication apparatus including a higher layer circuitry configured to aggregate multiple MPDUs and to configure a delimiter for each MPDU, a controller configured to transmit, to a PHY layer, an MPDU length corresponding to a frame length of each of the multiple MPDUs, and a transmitter configured to configure the MPDUs based on a prescribed coding block length, wherein in a case that a HARQ is configured in the frame, a single block of the blocks of the MPDUs is not allowed to include information of two or more MPDUs, and in a case that the HARQ is not configured in the frame, the single block is allowed to include information of two or more MPDUs.

(2) In the communication apparatus according to an aspect of the present invention described above in (1), the prescribed coding block length is configured based on an MCS and the MPDU length configured in the frame including the MPDU.

(3) In the communication apparatus according to an aspect of the present invention described above in (1), the prescribed coding block length is configured from the number of blocks configured in the frame including the MPDU, the number of blocks being configured based on an MCS and the MPDU length.

(4) An aspect of the present invention provides a communication method in a communication apparatus for transmitting a frame, the method including the steps of aggregating multiple MPDUs and configuring a delimiter for each MPDU, transmitting, to a PHY layer, an MPDU length corresponding to a frame length of each of the multiple MPDUs, and configuring the MPDUs based on a prescribed coding block length, wherein in a case that a HARQ is configured in the frame, a single block of the blocks of the MPDUs is not allowed to include information of two or more MPDUs, and in a case that the HARQ is not configured in the frame, the single block is allowed to include information of two or more MPDUs.

(5) An aspect of the present invention provides a communication apparatus for receiving a frame, the communication apparatus including a higher layer circuitry configured to have multiple MPDUs aggregated and a delimiter configured for each MPDU, a controller configured to transmit, to a PHY layer, an MPDU length corresponding to a frame length of each of the multiple MPDUs, and a receiver configured to block and decode the MPDUs based on a prescribed coding block length, wherein in a case that a HARQ is configured in the frame, a single block of the blocks of the MPDUs is not allowed to include information of two or more MPDUs, and in a case that the HARQ is not configured in the frame, the single block is allowed to include information of two or more MPDUs.

(6) In the communication apparatus according to an aspect of the present invention described in (5), the prescribed coding block length is configured based on an MCS and the MPDU length configured in the frame including the MPDU.

(7) In the communication apparatus according to an aspect of the present invention described in (5), the prescribed coding block length is configured from the number of blocks configured in the frame including the MPDU, the number of blocks being configured based on an MCS and the MPDU length.

(8) An aspect of the present invention provides a communication method in a communication apparatus for receiving a frame, the communication method including the steps of having multiple MPDUs aggregated and a delimiter configured for each MPDU, transmitting, to a PHY layer, an MPDU length corresponding to a frame length of each of the multiple MPDUs, and blocking and decoding the MPDUs based on a prescribed coding block length, wherein in a case that a HARQ is configured in the frame, a single block of the blocks of the MPDUs is not allowed to include information of two or more MPDUs, and in a case that the HARQ is not configured in the frame, the single block is allowed to include information of two or more MPDUs.

3.5. Advantageous Effects of Invention

According to an aspect of the present invention, in the IEEE 802.11 standard, efficient packet combining is enabled at the time of retransmission, and the reception SNR is improved to allow for contribution to improvement of low-latency communication and an increase in user throughput.

3.6. Description of Embodiments

Figure 12:
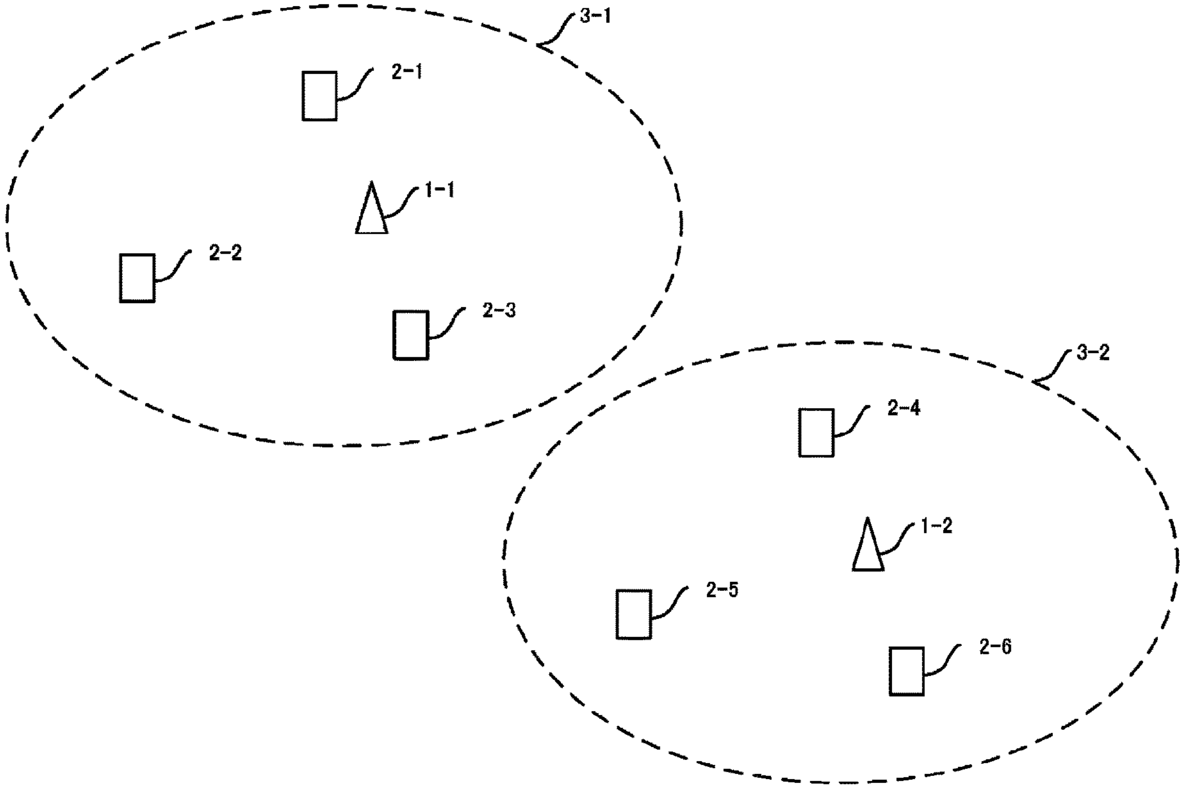
FIG. 12 is a diagram illustrating a configuration example of a communication system according to an aspect of the present invention.

FIG. 12 is a diagram illustrating an example of a radio communication system according to the present embodiment. A radio communication system 3-1 includes a radio communication apparatus 1-1 and radio communication apparatuses 2-1 to 2-3. Note that the radio communication apparatus 1-1 will also be referred to as a base station apparatus 1-1, and the radio communication apparatuses 2-1 to 2-3 will also be referred to as terminal apparatuses 2-1 to 2-3. In addition, the radio communication apparatuses 2-1 to 2-3 and the terminal apparatuses 2-1 to 2-3 will also be referred to as a radio communication apparatus 2A and a terminal apparatus 2A, respectively, as apparatuses associated to the radio communication apparatus 1-1. The radio communication apparatus 1-1 and the radio communication apparatus 2A are wirelessly connected and are in a state in which they can transmit and/or receive PPDUs to and from each other. Also, the radio communication system according to the present embodiment may include a radio communication system 3-2 in addition to the radio communication system 3-1. The radio communication system 3-2 includes a radio communication apparatus 1-2 and radio communication apparatuses 2-4 to 2-6. Note that the radio communication apparatus 1-2 will also be referred to as a base station apparatus 1-2 and the radio communication apparatuses 2-4 to 2-6 will also be referred to as terminal apparatuses 2-4 to 2-6. Also, the radio communication apparatuses 2-4 to 2-6 and the terminal apparatuses 2-4 to 2-6 will also be referred to as a radio communication apparatus 2B and a terminal apparatus 2B, respectively, as apparatuses associated to the radio communication apparatus 1-2. Although the radio communication system 3-1 and the radio communication system 3-2 form different BSSs, this does not necessarily mean that extended service sets (ESSs) are different. An ESS indicates a service set forming a local area network (LAN). In other words, radio communication apparatuses belonging to the same ESS can be regarded as belonging to the same network from a higher layer. Also, the BSSs are connected via a Distribution System (DS) and form an ESS. Note that each of the radio communication systems 3-1 and 3-2 can further include a plurality of radio communication apparatuses.

In connection with FIG. 12, the following description assumes that signals transmitted by the radio communication apparatus 2A reach the radio communication apparatus 1-1 and the radio communication apparatus 2B, but do not reach the radio communication apparatus 1-2. In other words, in a case that the radio communication apparatus 2A transmits a signal using a certain channel, whereas the radio communication apparatus 1-1 and the radio communication apparatus 2B determine that the channel is busy, the radio communication apparatus 1-2 determines that the channel is idle. In addition, it is assumed that signals transmitted by the radio communication apparatus 2B arrive at the radio transmission apparatus 1-2 and the radio communication apparatus 2A, but do not arrive at the radio communication apparatus 1-1. In other words, in a case that the radio communication apparatus 2B transmits a signal using a certain channel, whereas the radio communication apparatus 1-2 and the radio communication apparatus 2A determine that the channel is busy, the radio communication apparatus 1-1 determines that the channel is idle.

Figure 13:
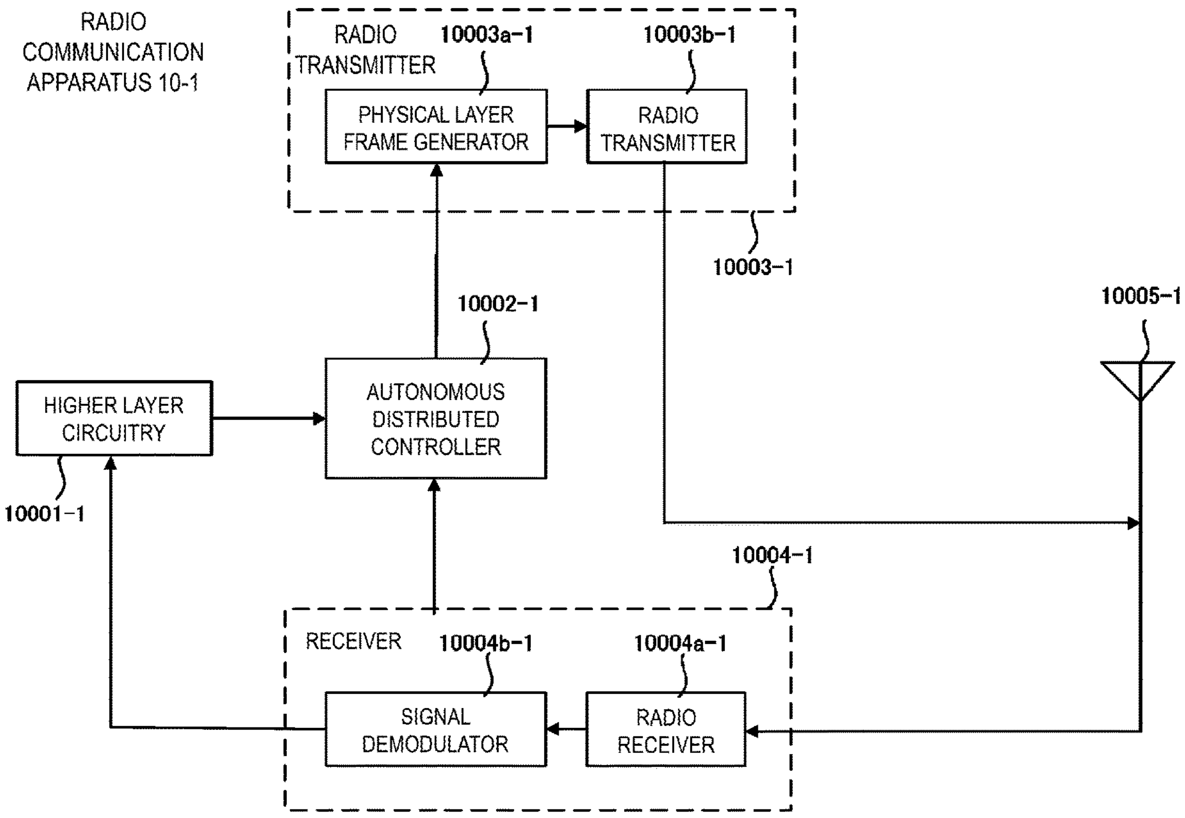
FIG. 13 is a block diagram illustrating a configuration example of a radio communication apparatus according to an aspect of the present invention.

FIG. 13 is a diagram illustrating an example of an apparatus configuration of the radio communication apparatuses 1-1, 1-2, 2A, and 2B (hereinafter, also collectively referred to as the radio communication apparatus 10-1 or the station apparatus 10-1, or simply the station apparatus). The radio communication apparatus 10-1 includes a higher layer circuitry (higher layer processing step) 10001-1, an autonomous distributed controller (autonomous distributed control step) 10002-1, a transmitter (transmission step) 10003-1, a receiver (reception step) 10004-1, and an antenna 10005-1.

The higher layer unit 10001-1 is connected to another network and can notify the autonomous distributed controller 10002-1 of information related to a traffic. The information related to a traffic may be control information included in a management frame such as a beacon, for example, or may be measurement information reported by another radio communication apparatus to the radio communication apparatus. Moreover, the information may be control information included in a management frame or a control frame with the destination not limited (the information may be directed to the apparatus, may be directed to another apparatus, may be broadcasting, or may be multicasting).

Figure 14:
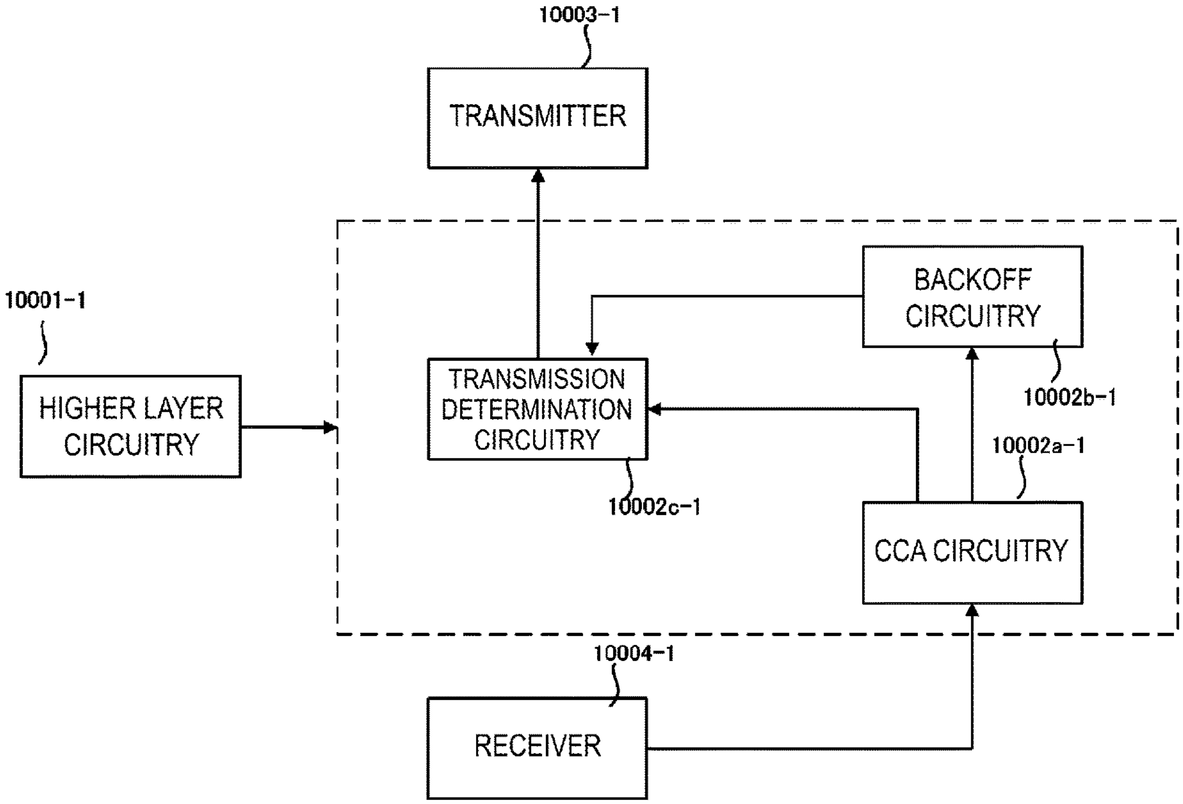
FIG. 14 is a block diagram illustrating a configuration example of a radio communication apparatus according to an aspect of the present invention.

FIG. 14 is a diagram illustrating an example of an apparatus configuration of the autonomous distributed controller 10002-1. The controller 10002-1 includes a CCA circuitry (CCA step) **10002*a*-1, a backoff circuitry (backoff step) 10002*b*-1, and a transmission determination circuitry (transmission determination step) 10002*c*-1**.

The CCA processor **10002*a*-1 can perform determination of a state of a radio resource (including determination between a busy state and an idle state) using any one of or both information related to reception signal power received via the radio resource and information related to the reception signal (including information after decoding) provided as a notification from the receiver 10004-1. The CCA circuitry 10002*a*-1 can notify the backoff circuitry 10002*b*-1 and the transmission determination circuitry 10002*c*-1** of the state determination information of the radio resources.

The backoff circuitry **10002*b*-1 can perform backoff using the state determination information of the radio resources. The backoff circuitry 10002*b*-1 has a function of generating a CW and counting down it. For example, countdown of CW is performed in a case that the state determination information of the radio resources indicates idle, and the countdown of the CW can be stopped in a case that the state determination information of the radio resources indicates busy. The backoff circuitry 10002*b*-1 can notify the transmission determination circuitry 10002*c*-1** of the value of the CW.

The transmission determination circuitry **10002*c*-1 performs transmission determination using any one of or both the state determination information of the radio resources and the value of the CW. For example, the transmitter 10003-1 can be notified of transmission determination information in a case that the state determination information of the radio resources indicates idle and the value of the CW is zero. In addition, the transmitter 10003-1** can be notified of the transmission determination information in a case that the state determination information of the radio resources indicates idle.

The transmitter 10003-1 includes a physical layer frame generator (physical layer frame generation step) **10003*a*-1 and a radio transmitter (radio transmission step) 10003*b*-1. The physical layer frame generator 10003*a*-1 has a function of generating a physical layer frame (PPDU) based on the transmission determination information notified of from the transmission determination circuitry 10002*c*-1. The physical layer frame generator 10003*a*-1 performs error correction coding, modulation, precoding filter multiplication, and the like on transmission frames sent from the higher layer. The physical layer frame generator 10003*a*-1 notifies the radio transmitter 10003*b*-1** of the generated physical layer frame.

The frame generated by the physical layer frame generator **10003*a*-1 includes control information. The control information includes information indicating in which RU the data addressed to each radio communication apparatus is allocated (here, the RU including both frequency resources and spatial resources). In addition, the frame generated by the physical layer frame generator 10003*a*-1** includes a trigger frame for indicating frame transmission to the radio communication apparatus that is a destination terminal. The trigger frame includes information indicating the RU to be used by the radio communication apparatus that has received the indication for the frame transmission to transmit the frame.

The radio transmitter **10003*b*-1 converts the physical layer frame generated by the physical layer frame generator 10003*a*-1 into a signal in a radio frequency (RF) band to generate a radio frequency signal. Processing performed by the radio transmitter 10003*b*-1** includes digital-to-analog conversion, filtering, frequency conversion from a baseband to an RF band, and the like.

The receiver 10004-1 includes a radio receiver (radio reception step) **10004*a*-1 and a signal demodulator (signal demodulation step) 10004*b*-1. The receiver 10004-1 generates information about reception signal power from a signal in the RF band received by the antenna 10005-1. The receiver 10004-1 can notify the CCA circuitry 10002*a*-1** of the information related to the received signal power and the information related to the received signal.

The radio receiver **10004*a*-1 has a function of converting a signal in the RF band received by the antenna 10005-1 into a baseband signal and generating a physical layer signal (e.g., a physical layer frame). Processing performed by the radio receiver 10004*a*-1** includes frequency conversion processing from the RF band to the baseband, filtering, and analog-to-digital conversion.

The signal demodulator **10004*b*-1 has a function of demodulating a physical layer signal generated by the radio receiver 10004*a*-1. Processing performed by the signal demodulator 10004*b*-1 includes channel equalization, demapping, error correction decoding, and the like. The signal demodulator 10004*b*-1 can extract, from the physical layer signal, information included in the PHY header, information included in the MAC header, and information included in the transmission frame, for example. The signal demodulator 10004*b*-1 can notify the higher layer circuitry 10001-1 of the extracted information. Further, the signal demodulator 10004*b*-1** can extract any one or all of the information included in the PHY header, the information included in the MAC header, and the information included in the transmission frame.

The antenna 10005-1 includes a function of transmitting the radio frequency signal generated by the radio transmitter **10003*b*-1 to a radio space. Also, the antenna 10005-1 includes a function of receiving the radio frequency signal and passing the radio frequency signal to the radio receiver 10004*a*-1**.

The radio communication apparatus 10-1 can cause radio communication apparatuses in the surroundings of the radio communication apparatus 10-1 to configure NAV corresponding to a period during which the radio communication apparatus uses a radio medium by describing information indicating the period in the PHY header or the MAC header of the frame to be transmitted. For example, the radio communication apparatus 10-1 can describe the information indicating the period in a Duration/ID field or a Length field of the frame to be transmitted. The NAV period configured to radio communication apparatuses in the surroundings of the radio communication apparatus will be referred to as a TXOP period (or simply TXOP) acquired by the radio communication apparatus 10-1. In addition, the radio communication apparatus 10-1 that has acquired the TXOP will be referred to as a TXOP acquirer (TXOP holder). The type of frame to be transmitted by the radio communication apparatus 10-1 to acquire TXOP is not limited to any frame type, and the frame may be a control frame (e.g., an RTS frame or a CTS-to-self frame) or may be a data frame.

The radio communication apparatus 10-1 that is a TXOP holder can transmit the frame to radio communication apparatuses other than the radio communication apparatus during the TXOP. In a case that the radio communication apparatus 1-1 is a TXOP holder, the radio communication apparatus 1-1 can transmit a frame to the radio communication apparatus 2A during the TXOP period. In addition, the radio communication apparatus 1-1 can indicate to the radio communication apparatus 2A to transmit a frame addressed to the radio communication apparatus 1-1 during the TXOP period. The radio communication apparatus 1-1 can transmit, to the radio communication apparatus 2A, a trigger frame including information for indicating a frame transmission addressed to the radio communication apparatus 1-1 during the TXOP period.

The radio communication apparatus 1-1 may reserve a TXOP for the entire communication band (e.g., operation bandwidth) in which frame transmission is likely to be performed, or may reserve a TXOP for a specific communication band (Band) such as a communication band in which frames are actually transmitted (e.g., transmission bandwidth).

The radio communication apparatus that provides an indication for transmitting a frame in the TXOP period acquired by the radio communication apparatus 1-1 is not necessarily limited to radio communication apparatuses associated to the radio communication apparatus. For example, the radio communication apparatus can provide an indication for transmitting frames to radio communication apparatuses that are not associated to the radio communication apparatus in order to cause the radio communication apparatuses in the surroundings of the radio communication apparatus to transmit management frames such as a Reassociation frame or control frames such as an RTS/CTS frame.

Furthermore, TXOP in EDCA that is a data transmission method different from DCF will also be described. The IEEE 802.11e standard relates to EDCA and defines TXOP in terms of guaranty of Quality of Service (QoS) for various services such as video transmission and VoIP. The services are roughly classified into four access categories, namely VOice (VO), VIdeo (VI), Best Effort (BE), and BacK ground (BK). In general, the services include VO, VI, BE, and BK with higher priority in this order. In each access category, there are parameters including a minimum value CWmin of CW, a maximum value CWmax of CW, Arbitration IFS (AIFS) as a type of IFS, and TXOP limit that is an upper limit value of a transmission opportunity, and values are set to have differences in priority. For example, it is possible to perform data transmission prioritized over the other access categories by setting a relatively small value for CWmin, CWmax, and AIFS of VO with the highest priority for the purpose of voice transmission as compared with the other access categories. For example, in a case of VI with a relatively large amount of transmission data to transmit a video, it is possible to extend a transmission opportunity as compared with the other access categories by configuring TXOP limit to be large. In this manner, four parameter values of the access categories are adjusted for the purpose of guaranteeing QoS in accordance with various services.

Figure 15:
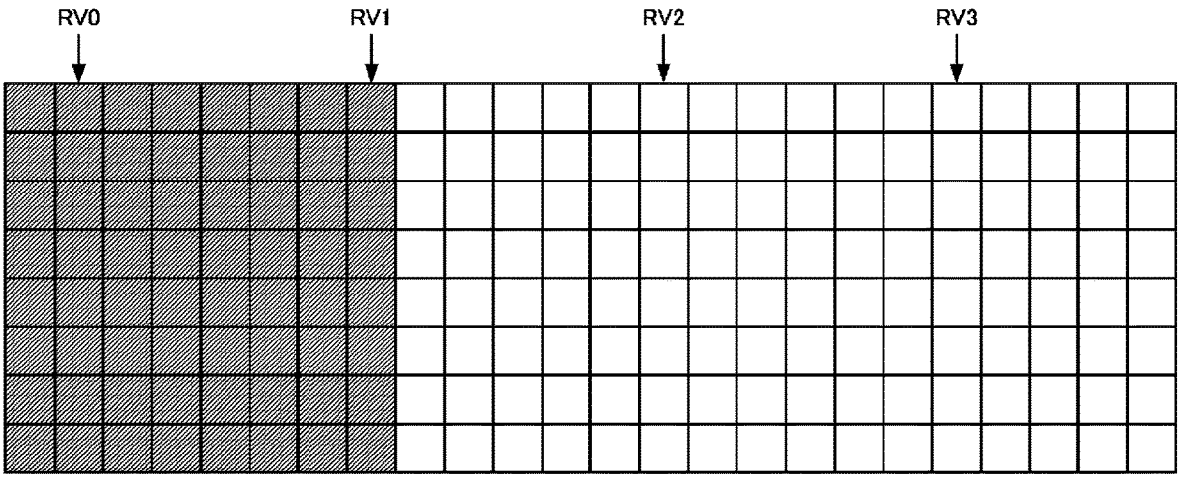
FIG. 15 is a schematic diagram illustrating an example of a coding scheme according to an aspect of the present invention.

FIG. 15 is a diagram illustrating an example of error correction coding performed by a physical layer frame generation circuitry 10003*a*-1 according to the present embodiment. As illustrated in FIG. 15, an information bit (systematic bit) sequence is allocated in a hatched region, and a redundant (parity) bit sequence is allocated in a white region. A bit interleaver is appropriately applied to the information bits and to the redundant bits. The physical layer frame generation circuitry 10003*a*-1 can read a necessary number of bits as a start position determined according to the value of the redundancy version (RV) for the allocated bit sequence. By adjusting the number of bits, the coding rate can be flexibly changed, that is, puncturing can be performed. Note that FIG. 15 illustrates a total of four RVs but that choices of RVs are not limited to a specific value in the error correction coding according to the present embodiment. The positions of the RVs need to be shared among the station apparatuses. Of course, the error correction coding method according to the present embodiment is not limited to the example of FIG. 15, and any method may be used that enables the coding rate to be changed and that achieves the decoding processing to be achieved on the reception side.

In the embodiments described below, the radio communication apparatus 1-1 (base station apparatus 1-1) performs transmission and the radio communication apparatus 2-1 (terminal apparatus 2-1) performs reception. However, the present invention is not limited to this and includes a case where the radio communication apparatus 2-1 (terminal apparatus 2-1) performs transmission and the radio communication apparatus 1-1 (base station apparatus 1-1) performs reception. Note that the apparatus configurations of the radio communication apparatus 1-1 and the radio communication apparatus 2-1 is the same as the apparatus configuration examples described with reference to FIG. 13 and FIG. 14 unless otherwise specified.

The higher layer circuitry 10001-1 of the radio communication apparatus 1-1 according to the present embodiment configures, from the information bit sequence transferred to the MAC layer, one MPDU or an A-MPDU into which two or more MPDUs are aggregated and which corresponds to a payload of the MAC layer, and then transfers the MPDU or A-MPDU to the transmitter 10003-1. The higher layer circuitry 10001-1 transfers the control information including the configuration of the retransmission scheme to the transmitter 10003-1. The configuration of the retransmission scheme is, for example, information indicating one of the ARQ or HARQ, or HARQ configuration information. The HARQ configuration information is information indicating whether the HARQ is configured. In a case that the HARQ is not configured, the PHY layer determines that the ARQ is configured. In a case that the information bit sequence includes one MPDU, the configuration of the MPDU, the MPDU length, and the retransmission scheme is transferred to the transmitter in the lower layer. On the other hand, in the case that the information bit sequence includes A-MPDU, the A-MPDU and the A-MPDU length are transferred to the transmitter in the lower layer in a case that the configuration of the retransmission scheme indicates the ARQ. In a case that the configuration of the retransmission scheme indicates the HARQ, some or all of the A-MPDU, the A-MPDU length, each MPDU length, and the number of MPDUs are transferred to the transmitter in the lower layer. The MPDU may constitute one MSDU or an A-MSDU into which two or more MSDUs are aggregated. Note that in a case that the retransmission scheme is not indicated as the HARQ, the control information of the MAC layer of the higher layer circuitry 10001-1 does not necessarily include an additional information field for setting the MPDU length and the number of MPDUs.

The physical layer frame generation circuitry 10003*a*-1 of the radio communication apparatus 1-1 according to the present embodiment first generates a PSDU corresponding to a payload of the PHY layer, from the A-MPDU transferred by the higher layer circuitry 10001-1. A PHY header is added to the PSDU to generate a PPDU for the transmission frame. The PHY header includes a PLCP preamble for synchronization detection, a PLCP header for determining a Modulation and Coding Scheme (MCS) in accordance with the received signal strength, control information notified by the MAC layer of the higher layer circuitry 10001-1, and an information field of a prescribed information bit length (coding block length) to be subjected to error correction coding corresponding to each information field in a case that an information field of the MPDU length is added to the control information. Note that in a case that the MAC layer of the higher layer circuitry 10001-1 does not configure aggregation of MPDUs, the PHY header may set the prescribed information bit length in the information field.

For example, in error correction coding using a Low Density Parity Check (LDPC) of the IEEE 802.11 standard, a generation matrix is first obtained from a low-density parity check matrix, and parity bits are generated that are calculated from a matrix product of the generation matrix and information bits. Next, the parity bit is added to the information bit sequence to form a codeword. Specifically, the physical layer frame generation circuitry 10003*a*-1 calculates a prescribed information bit length to be subjected to error correction coding based on the size of the parity check matrix configured in accordance with the coding rate of the MCS. Note that an information bit sequence used for LDPC coding is also referred to as an LDCP information block, and a bit sequence obtained by LDPC-coding an LDPC information block is also referred to as an LDPC codeword block.

FIG. 16 illustrates an example of association between the MCS and the modulation scheme and the coding rate. For example, in a case that the MCS is 1, the modulation scheme is QPSK and the coding rate is ½, and in a case that the MCS is 4, the modulation scheme is 16QAM and the coding rate is ¾. FIG. 17 illustrates an example of association between the coding rate and an LDPC information block length and an LDPC codeword block length. In a case that the LDPC codeword block length is multiplied by the coding rate, the LDPC information block length is obtained. For example, in a case that the coding rate is ½, candidates of (LDPC information block length, LDPC codeword block length) are (972, 1944), (648, 1296), and (324, 648). Note that the LDPC information block length and the LDPC codeword block length are values determined by the parity check matrix size, and may be different from the transmitted information block length and codeword block length.

Figure 18:
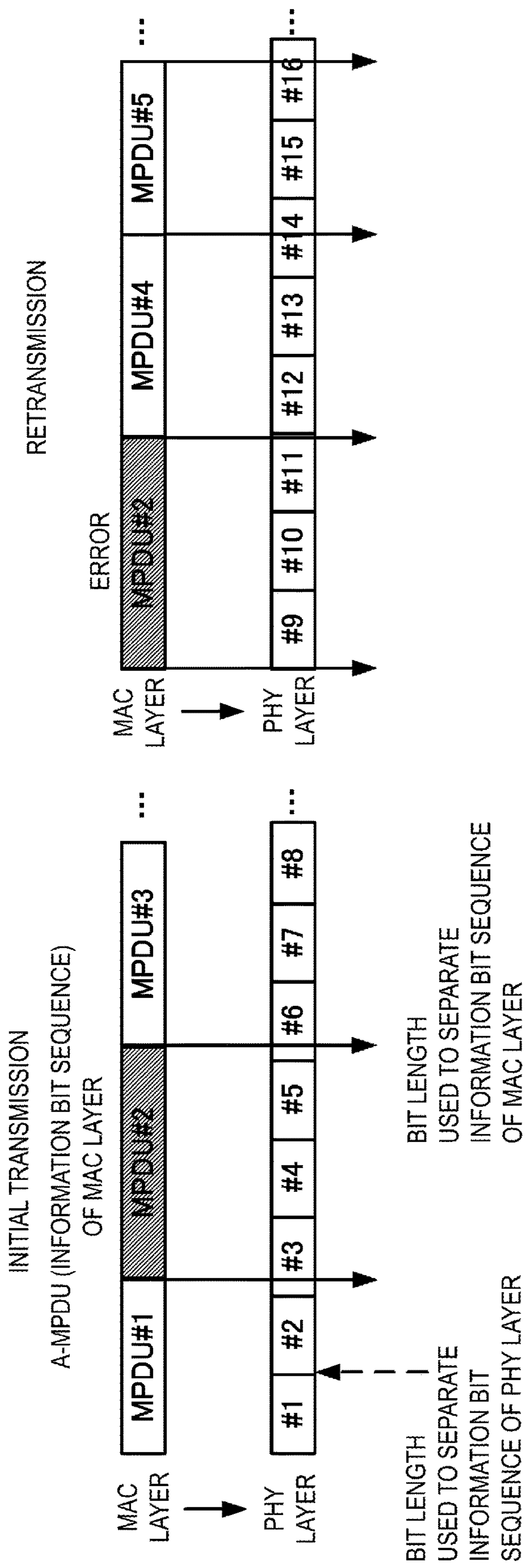
FIG. 18 is a schematic diagram illustrating an example of blocking processing according to an aspect of the present invention.

FIG. 18 is a schematic diagram illustrating an example of blocking processing executed by the physical layer frame generation circuitry 10003*a*-1 in a case that the configuration of the retransmission scheme indicates the ARQ. The physical layer frame generation circuitry 10003*a*-1 in the figure generates a transmission frame by dividing the PSDU into information blocks corresponding to multiple payloads by using the prescribed information bit length determined by the MCS included in the PHY header, and performing error correction coding on each information block. Note that an information block subjected to error correction coding is also referred to as a codeword block. In the blocking processing in the figure, the prescribed bit length used by the MAC layer to separate the information bit sequence into PSDUs may not match an allocation of multiple prescribed bit lengths used by the PHY layer to separate the information bit sequence into PSDUs. In other words, the physical layer frame generation circuitry 10003*a*-1 permits allows each information block to include two or more MPDUs. Each of block #3 and block #6 in FIG. 18 includes two or more MPDUs, and block #3 sets a part of the information bit sequence included in MPDUs #1 and #2 and block #6 sets a part of the information bit sequence included in MPDUs #2 and #3. Note that in this example, the MAC layer of the higher layer circuitry 10001-1, having received the Block Ack in the transmission frame, retransmits MPDU #2 because an error is detected in MPDU #2. In a case that MPDU #2 is retransmitted, the PHY layer blocks and transmits the PSDU. However, in a case that a block of the PHY layer includes multiple MPDUs, the PSDU may be divided into blocks different from those used at the time of initial transmission, and in this case, different codeword blocks are transmitted. In this case, the reception side fails to combine the initially transmitted MPDU #2 and the retransmitted MPDU #2.

Description will be given of an example of a procedure in which the physical layer frame generation circuitry 10003*a*-1 divides the PSDU (A-MPDU) into information blocks in a case that the configuration of the retransmission scheme indicates ARQ. The LDPC codeword block length is determined by a coded bit length (also referred to as a first coded bit length) calculated based on at least the PSDU length (A-MPDU length) and the coding rate. For example, in the example of FIG. 17, in a case that the first coded bit length is 648 bits or less, the LDPC codeword block length ($L_{CW}$) is 648 bits. Next, in a case that the first coded bit length is greater than 648 bits and 1296 bits or less, the LDPC codeword block length is 1296 bits. In a case that the first coded bit length is greater than 1296 bits and 1944 bits or less, the LDPC codeword block length is 1944 bits. In a case that the first coded bit length is 1944 bits or less, the number of LDPC codeword blocks ($N_{CW}$) is 1. In a case that the first coded bit length is greater than 1944 bits and 2592 bits or less, the LDPC codeword block length is 1296 bits and the number of LDPC codeword blocks is 2. In a case that the LDPC codeword block length is larger than 2592 bits, the LDPC codeword block length is 1944 bits, and the number of LDPC codeword blocks can be calculated as ceil (first coded bit length/1944) from the first coded bit length and 1944 bits corresponding to the LDPC codeword block length. Note that ceil (x) is a ceiling function and represents the minimum integer equal to or greater than x.

In a case that $N_{CW}*L_{CW}*R$ is different from the PSDU length, shortening processing is performed. Note that R represents the coding rate. The difference between $N_{CW}*L_{CW}*R$ and the PSDU length is denoted by $N_{shrt}$. $N_{shrt}$ is equally distributed among the information blocks. In other words, the shortening bit $N_{shblk}$ of each information block is floor ($N_{shrt}/N_{CW}$). However, floor (x) is a floor function and represents the maximum integer less than or equal to x. Note that the first $N_{shrt}$ mod $N_{CW}$ block includes one more shortening bit than the other blocks. However, mod represents a remainder. In the shortening processing, $N_{shblk}$ (or $N_{shblk}+1$) bits are added to the information block to generate an LDPC information block. Accordingly, the PSDU is divided into information blocks in consideration of the shortening processing. The LDPC information block is LDPC-coded to generate an LDPC codeword block, but the shortening bits are discarded.

In a case that $N_{CW}*L_{CW}$ and (first coded bit length+$N_{shrt}$) are different from each other, puncturing processing is performed to discard (decimate) parity bits. The difference between $N_{CW}*L_{CW}$ and (first coded bit length+$N_{shrt}$) is represented by $N_{punc}$. $N_{punc}$ is equally distributed among the codeword blocks. In other words, the puncturing bit $N_{pcblk}$ of each codeword block is floor ($N_{punc}/N_{CW}$). Note that the first $N_{punc}$ mod $N_{CW}$ block includes one more puncturing bit than the other blocks. In the puncturing processing, the last $N_{pcblk}$ bits (or $N_{pcblk}+1$ bits) of the LDPC codeword block are discarded. The shortening processing and the puncturing processing generate a codeword block to be transmitted.

Figure 19:
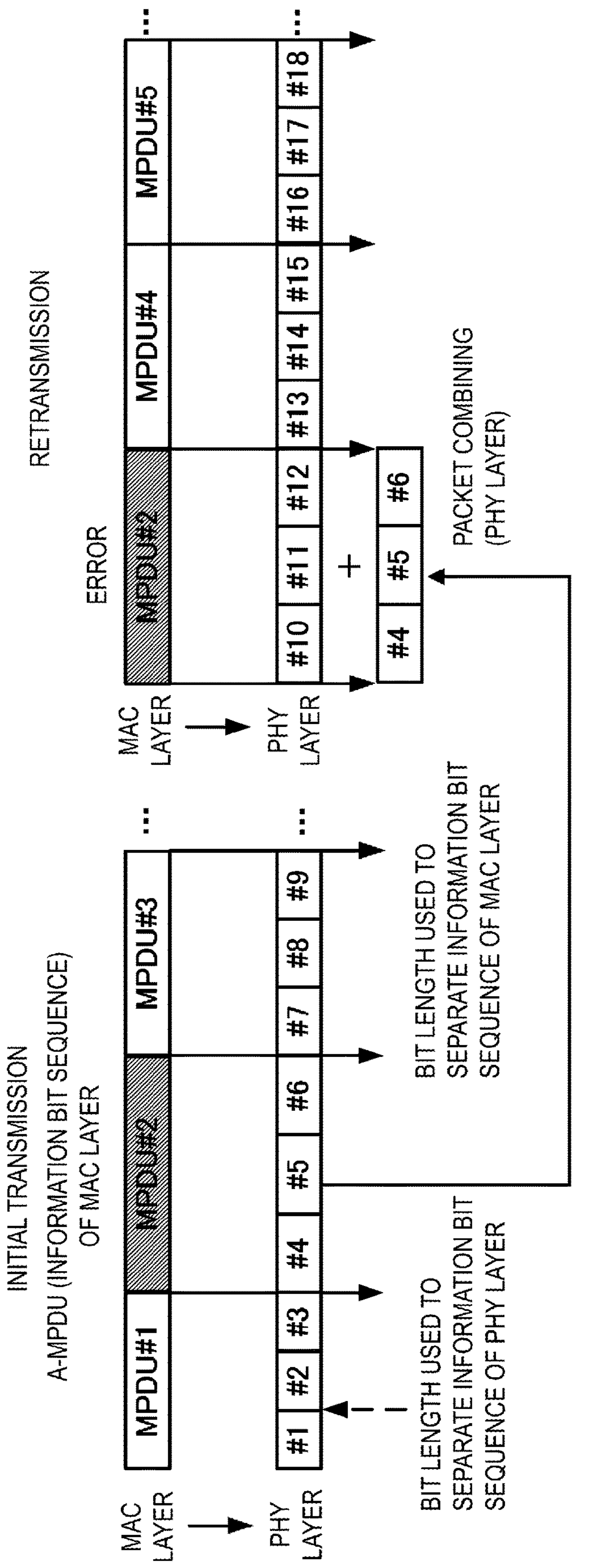
FIG. 19 is a schematic diagram illustrating an example of blocking processing according to an aspect of the present invention.

FIG. 19 is a schematic diagram illustrating an example of blocking processing performed by the physical layer frame generation circuitry 10003*a*-1 in a case that the control information of the MAC layer includes the information field of the MPDU length (in a case that the configuration of the retransmission scheme indicates the HARQ). The physical layer frame generation circuitry 10003*a*-1 in the figure divides each of the MPDUs constituting the PSDU into multiple information blocks based on the MPDU length of the control information in addition to the prescribed information bit length specified by the MCS included in the PHY header. The physical layer frame generation circuitry 10003*a*-1 calculates and sets the information block length in the information field of the header. In a case that an integer multiple of the information block length is the MPDU length, the number of information blocks may be set in the PHY header. Subsequently, each information block is subjected to error correction coding to generate a transmission frame. In the blocking processing in the figure, one MPDU includes one or more information blocks. In other words, the physical layer frame generation circuitry 10003*a*-1 is not allowed to include two or more MPDUs in each block. Blocks #4 to #6 in the figure each set an information bit sequence of MPDU #2. Note that in this example, the MAC layer of the higher layer circuitry 10001-1, having received the Block Ack in the transmission frame, retransmits MPDU #2 because an error is detected in MPDU #2. Since each MPDU is divided into information blocks, the same codeword block as that used at the time of the initial transmission can be transmitted at the time of retransmission. In this case, the initially transmitted MPDU #2 is combined with the retransmitted MPDU #2 to enable reception quality to be improved.

In a case that the configuration of the retransmission scheme indicates the HARQ, the LDPC codeword block length is determined by a coded bit length (also referred to as a second coded bit length) calculated based on at least the MPDU length and the coding rate. In a case that the MPDU length varies with each MPDU, the second coded bit length is calculated for each MPDU. For example, in a case that the second coded bit length is 648 bits or less, the LDPC codeword block length is 648 bits. In a case that the second coded bit length is greater than 648 bits and 1296 bits or less, the LDPC codeword block length is 1296 bits. In a case that the second coded bit length is greater than 1296 bits and 1944 bits or less, the LDPC codeword block length is 1944 bits. Note that in a case that the second coded bit length is 1944 bits or less, the number of LDPC codeword blocks is 1. In a case that the second coded bit length is greater than 1944 bits and 2592 bits or less, the LDPC codeword block length is 1296 bits and the number of LDPC codeword blocks is 2. In a case that the LDPC codeword block length is larger than 2592 bits, the LDPC codeword block length is 1944 bits, and the number of LDPC codeword blocks can be calculated as ceil (second coded bit length/1944) from the second coded bit length and 1944 bits corresponding to the LDPC codeword block length.

In a case that the configuration of the retransmission scheme indicates the HARQ, the shortening processing is performed for each MPDU. In a case that $N_{CW}*L_{CW}*R$ is different from the MPDU length, the shortening processing is performed. The difference between $N_{CW}L_{CW}R$ and the MPDU length is represented by $N_{shrt}$. $N_{shrt}$ is equally distributed among the information blocks. In other words, the shortening bit $N_{shblk}$ of each information block is floor ($N_{shrt}/N_{CW}$). Note that the first $N_{shrt}$ mod $N_{CW}$ block includes one more shortening bit than the other blocks. However, mod represents a remainder. In the shortening processing, $N_{shblk}$ (or $N_{shblk}+1$) bits are added to the information block to generate an LDPC information block. Accordingly, the PSDU is divided into information blocks in consideration of the shortening processing. The LDPC information block is LDPC-coded to generate an LDPC codeword block, but the shortening bits are discarded.

In a case that the configuration of the retransmission scheme indicates the HARQ, the puncturing processing is performed for each MPDU. In a case that $N_{CW}*L_{CW}$ is different from (second coded bit length+$N_{shrt}$), the puncturing processing is performed. The difference between $N_{CW}*L_{CW}$ and (second coded bit length+$N_{shrt}$) is represented by $N_{punc}$. $N_{punc}$ is equally distributed among the codeword blocks. In other words, the puncturing bit $N_{pcblk}$ of each codeword block is floor ($N_{punc}/N_{CW}$). Note that the first $N_{pcblk}$ mod $N_{CW}$ block includes one more puncturing bit than the other blocks. In the puncturing processing, the last $N_{pcblk}$ bits (or $N_{pcblk}+1$ bits) of the LDPC codeword block are discarded. The shortening processing and the puncturing processing generate a codeword block to be transmitted.

On the other hand, in a case that the MAC-layer control information includes the information field of the MPDU length (in a case that the configuration of the retransmission scheme indicates the ARQ), the physical layer frame generation circuitry **10003*a*-1** according to the present embodiment can perform the blocking processing on the PSDU with the coded block length by referencing a table or a calculation formula that enables the coded block length to be calculated according to the MCS and the MPDU length.

Note that the coding method according to the present embodiment is not limited to the LDPC. For example, the transmission apparatus according to the present embodiment can also use a Binary Convolutional Code (BCC). At this time, the transmission apparatus can use BCC and the blocking processing method described above, that is, the blocking processing performed in a case that ARQ is configured and the blocking processing performed in a case that the HARQ is configured. For example, in a case that the HARQ is configured, the transmission apparatus can match the number of information bits included in the information block with the number of bits included in the MPDU. The transmission apparatus can match an integer multiple of the number of information bits included in the information block with the number of bits included in the MPDU.

The transmission apparatus according to the present embodiment can switch the blocking processing depending on the error correction coding method configured in the PHY layer. For example, in a case that BCC is configured as the error correction coding method, the transmission apparatus can perform the blocking processing assuming the ARQ, and in a case that LDPC is configured, the transmission apparatus can perform blocking processing assuming the HARQ. In a case that BCC is configured, the transmission apparatus may perform the blocking processing assuming the HARQ, and in a case that the LDPC is configured, the transmission apparatus may perform the blocking processing assuming the ARQ.

The table or calculation formula may include multiple MPDU length candidate values for each maximum MPDU size (e.g., 3895, 7991, 11454 bytes for 11ac), and may set, in each of the MPDU lengths, a candidate value for a prescribed information bit length to be coded for each MCS. For example, in a case that one MPDU length constituting the A-MPDU transferred from the higher layer circuitry 10001-1 according to the present embodiment is 3895 bytes or less, the transmitter can reference the table or the calculation formula to select a candidate value that is the same as the MPDU length of the MPDU or a candidate value that is closest to the MPDU length, and can sequentially acquire candidate values of the coded block length as indexes according to the MCS. The station apparatus, the access point, and the like according to the present embodiment can update the table or the calculation formula by a management frame such as a beacon frame, and can share the index of the coded block length.

In the blocking processing using the table and the calculation formula, the PHY header included in the transmission frame includes a PLCP preamble for performing synchronization detection, a PLCP header for determining the modulation and coding scheme (MCS) corresponding to the received signal strength, control information for notifying the ARQ/HARQ in the MAC layer of the higher layer circuitry 10001-1, and the index enabling the coded block length to be referenced.

In a case that the configuration of the retransmission scheme indicates the HARQ, the MPDU length and/or the MCS can be limited to prevent one information block from including the bits of multiple MPDUs. For example, the MPDU length is limited to an integer multiple of the LDPC information block length corresponding to an LDPC codeword block length of 1944 bits, and the use of the MCSs other than the MCS with the coding rate corresponding to a LDPC block length that is a divisor of the MPDU is limited. For example, in a case that multiple MPDUs of 1458 bytes are aggregated into a PSDU, since the MPDU length is divisible by LDPC information blocks corresponding to coding rates of ½, ⅔, and ¾, the result remains unchanged regardless of whether the PSDU is subjected to the blocking processing or each MPDU is subjected to the blocking processing. Accordingly, in a case that the configuration of the retransmission scheme indicates the HARQ and the MPDU length is 1458 bytes, by avoiding the use of MCS7 and MCS9 with a coding rate of ⅚ corresponding to the LDPC information block length by which the MPDU length is indivisible, HARQ combining can be performed on the reception side even in a case that the PSDU is subjected to the flocculation processing as in the case that the configuration of the retransmission scheme indicates the ARQ. Even in a case that the retransmission scheme is configured as the HARQ, the retransmission scheme may mean the ARQ in a case that a limited MCS is used. For example, in a case that MCS7 is applied for an MPDU length of 1458 bytes, the retransmission scheme may indicate the ARQ. In this case, even in a case that the configuration of the retransmission scheme indicates the HARQ, the radio communication apparatus 1-1 performs blocking processing on the PSDU and transmits the blocked PSDU.

The radio communication apparatus 1-1 according to the present embodiment indicates, as the ARQ/HARQ, the retransmission scheme included in the control information notified by the MAC layer of the higher layer circuitry 10001-1, allowing configuration indicating whether to add the control information with information fields for the MPDU lengths constituting the A-MPDU. This allows switching between the blocking processing on the PSDU and the blocking processing on the MPDU according to the control information.

In a case of reporting function information (Capability, Capability element, and Capability information) included in the radio communication apparatus 1-1 by using a beacon frame, a probe response frame, or the like, then the radio communication apparatus 1-1 according to the present embodiment can include, in the function information, information indicating whether to configure the HARQ in a frame transmitted by the radio communication apparatus 1-1. The radio communication apparatus 1-1 can refuse the connection, to the radio communication apparatus 1-1, of a communication apparatus that cannot interpret a frame configured with the HARQ.

The radio communication apparatus 1-1 can determine whether to configure the HARQ in a frame including the PSDU transmitted by the radio communication apparatus 1-1, depending on the length of the PSDU. For example, in a case that the length of the PSDU exceeds a prescribed length, the radio communication apparatus may avoid configuring the HARQ in the frame including the PSDU. Here, the length of the PSDU can be the number of information bits included in the PSDU, the number of bits included in a codeword block subjected to error correction coding, the time length of a frame included in the PSDU, or the like.

The radio communication apparatus 1-1 can configure the HARQ in the transmission frame only within the period of the TXOP acquired by using the control frame such as the RTS frame or the CTS frame. The radio communication apparatus can include, in the frame for acquiring the TXOP, information indicating that the HARQ is configured or may be configured in a frame transmitted within the period of the TXOP. The radio communication apparatus can transmit, to multiple radio communication apparatuses, the frame for acquiring the TXOP. The radio communication apparatus can include, in the frame for acquiring the TXOP, information indicating multiple destination radio communication apparatuses (for example, information including multiple AIDs or information directly indicating multiple AIDs). The radio communication apparatus that receives the frame for acquiring the TXOP and that is one of the destinations can transmit a response frame in response to the frame for acquiring the TXOP. In this case, the response frame may include information indicating whether the radio communication apparatus can interpret a frame configured with the HARQ. In response to the frame for acquiring the TXOP, the response frame can be transmitted only in a case that the radio communication apparatus can interpret the frame configured with the HARQ.

The radio communication apparatus 2-1 according to the present embodiment receives the transmission frame from the radio communication apparatus 1-1. The signal demodulation circuitry **10004*b*-1 of the radio communication apparatus 2-1 according to the present embodiment decodes the codeword of the PSDU included in the received transmission frame. Then, the decoding result is transferred to the higher layer circuitry 10001-1. The higher layer circuitry 10001-1** performs error detection on the frame and determines whether the frame is correctly decoded. The error detection includes error detection using an error detection code (e.g., a cyclic redundancy check (CRC) code) added to the received transmission frame, and error detection using an error detection code having its own error detection function (e.g., low-density parity-check code (LDPC)).

In a case that the configuration of the retransmission scheme indicates the ARQ, the signal demodulation circuitry **10004*b*-1 of the radio communication apparatus 2-1 according to the present embodiment reads, from the PHY header, the prescribed information bit length and coding rate specified by the MCSs, and calculates the prescribed information bit length (codeword block length) to be decoded. Then, the signal demodulation circuitry 10004*b*-1 performs, for each codeword block, decoding processing on the PSDU subjected to error correction coding. The MAC layer of the higher layer circuitry 10001-1 determines whether the MPDU or the A-MPDU has correctly been decoded from the decoded PSDU. For example, in the example of FIG. 18, the MAC layer of the higher layer circuitry 10001-1 detects an error in MPDU #2 and thus transmits, to the radio communication apparatus 1-1, the Block Ack indicating that MPDU #2 is a NACK. In order to transmit MPDU #2 and succeeding new MPDUs #4 and #5, the radio communication apparatus 1-1 generates blocks #9 to #16 with the coded block length and generates a retransmission frame. Note that the retransmission frame may exclusively include MPDU #2. In the blocking processing of FIG. 18, the prescribed bit length used by the MAC layer to separate the PSDU does not match an allocation of multiple prescribed bit lengths used by the PHY layer to separate the PSDU. Accordingly, MPDU #2 included in the retransmission frame and the initially transmitted MPDU #2 form different codewords, and thus the signal demodulation circuitry 10004*b*-1 of the radio communication apparatus 2-1** does not perform packet combining.

Description will be given of an example of a procedure in which the signal demodulation circuitry **10004*b*-1 of the radio communication apparatus 2-1 performs decoding in a case that the configuration of the retransmission scheme indicates the ARQ. First, a first coded bit length for the PSDU is obtained based on the number of OFDM symbols and the MCS in the received frame. Then, the LDPC codeword block length is obtained from the first coded bit length. For example, in the example of FIG. 17, in a case that the first coded bit length is 648 bits or less, the LDPC codeword block length is 648 bits. In a case that the first coded bit length is greater than 648 bits and 1296 bits or less, the LDPC codeword block length is 1296 bits. In a case that the first coded bit length is greater than 1296 bits and 1944 bits or less, the LDPC codeword block length is 1944 bits. In a case that the first coded bit length is 1944 bits or less, the number of LDPC codeword blocks is 1. In a case that the first coded bit length is greater than 1944 bits and 2592 bits or less, the LDPC codeword block length is 1296 bits and the number of LDPC codeword blocks is 2. In a case that the LDPC codeword block length is larger than 2592 bits, the LDPC codeword block length is 1944 bits, and the number of LDPC codeword blocks can be calculated as ceil (first coded bit length/1944) from the first coded bit length and 1944 bits corresponding to the LDPC codeword block length. Then, the shortening bit length and the puncturing bit length are calculated to obtain the codeword block length. Then, the first coded bits are divided into codeword blocks. Reverse processing of the shortening processing and puncturing processing performed on the transmission side is performed on the codeword block to generate an LDCP codeword block. In the reverse processing of the shortening processing, a Log Likelihood Ratio (LLR) having a large absolute value indicating bit 0 is inserted at the position of the shortening bit discarded on the transmission side. In the reverse processing of the puncturing processing, an LLR having a value of 0** is inserted at the position of the puncturing bit discarded on the transmission side. The LDPC codeword block is subjected to error correction decoding to obtain an LDPC information block.

In a case that the configuration of the retransmission scheme indicates the HARQ, the signal demodulation circuitry **10004*b*-1 of the radio communication apparatus 2-1 according to the present embodiment reads, from the PHY header, the information fields of the coding rate and coded block length specified by the MCS, and calculates the codeword block length. Then, the signal demodulation circuitry 10004*b*-1 performs the decoding processing on the PSDU for each codeword block, and transfers the decoding result to the higher layer circuitry 10001-1. The MAC layer of the higher layer circuitry 10001-1 performs error detection and determines whether the MPDU or the A-MPDU has correctly been decoded from the decoded PSDU. In the example of FIG. 19, the MAC layer of the higher layer circuitry 10001-1 detects an error with MPDU #2 and thus transmits, to the radio communication apparatus 1-1, the Block Ack indicating that MPDU #2 is a NACK. The Block Ack frame may include, in the information field, the sequence number in the information block corresponding to the sequence number of the MPDU in which an error has been detected. The radio communication apparatus 1-1 can transmit MPDU #2 and succeeding new MPDUs #4 and #5, and generates blocks #10 to #18 with the information block length and configures a retransmission frame. Note that the retransmission frame may exclusively include MPDU #2. In a case that the configuration of the retransmission scheme indicates the HARQ, the prescribed bit length used by the MAC layer to separate the PSDU matches an allocation of multiple prescribed bit lengths used by the PHY layer to separate the PSDU. Accordingly, the signal demodulation circuitry 10004*b*-1 of the radio communication apparatus 2-1 can perform packet combining on the retransmitted MPDU #2 and the initially transmitted MPDU #2** set in a buffer, leading to increased received power, a produced time diversity effect, and the like.

Description will be given of an example of a procedure in which the signal demodulation circuitry **10004*b*-1 of the radio communication apparatus 2-1 performs decoding in a case that the configuration of the retransmission scheme indicates the HARQ. First, the second coded bit length for the MPDU is obtained based on the number of OFDM symbols and the MCS in the received frame. Then, the LDPC codeword block length is obtained from the second coded bit length. For example, in a case that the second coded bit length is 648 bits or less, the LDPC codeword block length is 648 bits. Next, in a case that the second coded bit length is greater than 648 bits and 1296 bits or less, the LDPC codeword block length is 1296 bits. In a case that the second coded bit length is greater than 1296 bits and 1944 bits or less, the LDPC codeword block length is 1944 bits. Note that in a case that the second coded bit length is 1944 bits or less, the number of LDPC codeword blocks is 1. In a case that the second coded bit length is greater than 1944 bits and 2592 bits or less, the LDPC codeword block length is 1296 bits and the number of LDPC codeword blocks is 2. In a case that the LDPC codeword block length is larger than 2592 bits, the LDPC codeword block length is 1944 bits, and the number of LDPC codeword blocks can be calculated as ceil (second coded bit length/1944) from the second coded bit length and 1944 bits corresponding to the LDPC codeword block length. Then, the shortening bit length and the puncturing bit length are calculated to obtain the codeword block length. Then, the second coded bits are divided into codeword blocks. Reverse processing of the shortening processing and puncturing processing performed on the transmission side is performed on the codeword block to generate an LDCP codeword block. In the reverse processing of the shortening processing, a Log Likelihood Ratio (LLR) having a large absolute value indicating bit 0** is inserted at the position of the shortening bit discarded on the transmission side. In the reverse processing of the puncturing processing, an LLR having a value of 0 is inserted at the position of the puncturing bit discarded on the transmission side. The LDPC codeword block is subjected to error correction decoding to obtain an LDPC information block. In the case of retransmission, error correction decoding is performed after LLR combining of the initially transmitted LDPC codeword block and the retransmitted LDCP codeword block.

On the other hand, in a case that the information field of the PHY header of the received transmission frame sets the index of the coded block length, then in the decoding processing performed by the signal demodulation circuitry **10004*b*-1 according to the present embodiment, the codeword block length can be calculated by referencing the index in the table or the calculation formula. Then, the signal demodulation circuitry 10004*b*-1 decodes each MPDU for each codeword block length, and transfers the decoding result to the higher layer circuitry 10001-1**. In a case that multiple block lengths corresponding to the lengths of the respective MPDUs constituting the A-MPDU are set in the PHY header, reduced transmission efficiency is indicated by an increased ratio of overheads occupying the PHY layer caused by an increased number of MPDUs aggregated in the MAC layer. In the decoding processing using the table or the calculation formula, each MPDU length can be referenced by using the index, and packet combining with high transmission efficiency can be achieved due to reduction in overheads.

Note that in a case that the configuration of the retransmission scheme indicates the HARQ, the radio communication apparatus 2-1 may obtain a codeword block for decoding from the first coded bit length for the PSDU in a case that a prescribed MCS is applied with a prescribed MPDU length.

As described above, the communication apparatus according to the present embodiment can contribute to improvement of communication quality and transmission efficiency by reducing the overheads on the PHY layer and the MAC layer and performing effective packet combining in the PHY layer while maintaining the retransmission function of the MAC layer.

4. Matters Common for All Embodiments

Although the communication apparatuses according to the present invention can perform communication in a frequency band (frequency spectrum) that is a so-called unlicensed band that does not require permission to use from a country or a region, available frequency bands are not limited thereto. The communication apparatus according to the present invention can exhibit its effect in a frequency band called a white band, which is actually not used for the purpose of preventing frequency jamming regardless of a nation or a region allowing utilization thereof for a specific service (for example, a frequency band allocated for television broadcasting or a frequency band which is not used depending on regions), or a shared spectrum (shared frequency band) which is expected to be shared by a plurality of service providers, for example.

A program that operates in the radio communication apparatus according to the present invention is a program (a program for causing a computer to function) for controlling the CPU or the like to implement the functions of the aforementioned embodiments related to the present invention. In addition, information handled by these apparatuses is temporarily accumulated in a RAM at the time of processing, is then stored in various types of ROMs and HDDs, and is read by the CPU as necessary to be corrected and written. A semiconductor medium (e.g., a ROM, a nonvolatile memory card, etc.), an optical recording medium (e.g., a DVD, an MO, an MD, a CD, a BD, etc.), a magnetic recording medium (e.g., a magnetic tape, a flexible disk, etc.), and the like can be examples of recording media for storing programs. In addition to implementing the functions of the aforementioned embodiments by performing loaded programs, the functions of the present invention are implemented in processing performed in cooperation of an operating system, other application programs, and the like based on instructions of those programs.

In a case of delivering these programs to market, the programs can be stored and distributed in a portable recording medium, or transferred to a server computer connected via a network such as the Internet. In this case, the storage device serving as the server computer is also included in the present invention. In addition, a part or an entirety of the communication apparatuses in the aforementioned embodiments may be implemented as an LSI that is typically an integrated circuit. The functional blocks of the communication apparatuses may be individually implemented as chips or may be partially or completely integrated into a chip. In a case that the functional blocks are made as integrated circuits, an integrated circuit controller for controlling them is added.

In addition, the circuit integration technique is not limited to LSI, and may be realized as dedicated circuits or a multi-purpose processor. Moreover, in a case that a circuit integration technology that substitutes an LSI appears with the advance of the semiconductor technology, it is also possible to use an integrated circuit based on the technology.

Note that, the invention of the present application is not limited to the above-described embodiments. The radio communication apparatus according to the invention of the present application is not limited to the application in the mobile station apparatus, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

Although the embodiments of the invention have been described in detail above with reference to the drawings, a specific configuration is not limited to the embodiments, and designs and the like that do not depart from the essential spirit of the invention also fall within the claims.

INDUSTRIAL APPLICABILITY

The present invention can be preferably used in a communication apparatus and a communication method.

The invention claimed is:

1. A terminal apparatus for communicating with an access point apparatus through multiple links (multi-link), the terminal apparatus comprising:
- transmission circuitry and reception circuitry, wherein:
- the multi-link comprises at least a first link and a second link,
- the transmission circuitry is configured to transmit a multi-link change request frame after the multi-link is established, and
- the reception circuitry is configured to receive a multi-link change response frame, wherein:
  - the multi-link change request frame includes information related to one of enablement and disablement of the first link and one of enablement and disablement of the second link, and
  - the enablement of the first link and the enablement of the second link are associated with at least one specific access category.

2. The terminal apparatus according to claim 1, wherein
- the transmission circuitry is further configured to transmit a frame belonging to the specific access category.

3. An access point apparatus for communicating with a terminal apparatus through multiple links (multi-link), the access point apparatus comprising:
- transmission circuitry and reception circuitry, wherein:
- the multi-link comprises at least a first link and a second link,
- the reception circuitry is configured to receive a multi-link change request frame after the multi-link is established, and
- the transmission circuitry is configured to transmit a multi-link change response frame, wherein:
  - the multi-link change request frame includes information related to one of enablement and disablement of the first link and one of enablement and disablement of the second link, and
  - the enablement of the first link and the enablement of the second link are associated with at least one specific access category.

4. A method performed by a terminal apparatus for communicating with an access point apparatus through multiple links (multi-link), wherein the multi-link comprises at least a first link and a second link, the method comprising:
- transmitting a multi-link change request frame after the multi-link is established; and
- receiving a multi-link change response frame, wherein:
  - the multi-link change request frame includes information related to one of enablement and disablement of the first link and one of enablement and disablement of the second link, and
  - the enablement of the first link and the enablement of the second link are associated with at least one specific access category.

* * * * *